United States Patent
Hyde et al.

(10) Patent No.: US 10,005,925 B2
(45) Date of Patent: Jun. 26, 2018

(54) ARTICLES WITH THIN MELT COATINGS AND METHODS FOR MAKING SAME

(71) Applicant: 3M INNOVATIVE PROPERTIES COMPANY, St. Paul, MN (US)

(72) Inventors: Patrick D. Hyde, Burnsville, MN (US); Jeffrey M. Imsande, Menomonie, WI (US); Jayshree Seth, Woodbury, MN (US); Craig E. Hamer, Woodbury, MN (US); Rebecca A. Shipman, Woodbury, MN (US); Robert B. Secor, Stillwater, MN (US); Michael C. Martin, Hudson, WI (US); Pentti K. Loukusa, Hanover, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 401 days.

(21) Appl. No.: 14/352,874

(22) PCT Filed: Oct. 19, 2012

(86) PCT No.: PCT/US2012/060952
§ 371 (c)(1),
(2) Date: Apr. 18, 2014

(87) PCT Pub. No.: WO2013/059549
PCT Pub. Date: Apr. 25, 2013

(65) Prior Publication Data
US 2014/0234584 A1    Aug. 21, 2014

Related U.S. Application Data

(60) Provisional application No. 61/549,078, filed on Oct. 19, 2011.

(51) Int. Cl.
*B05C 5/02* (2006.01)
*C09J 7/02* (2006.01)
(Continued)

(52) U.S. Cl.
CPC .......... *C09J 7/0217* (2013.01); *C09D 107/00* (2013.01); *C09D 121/00* (2013.01);
(Continued)

(58) Field of Classification Search
CPC .... B05C 3/00; B05C 3/18; B05C 5/10; B05C 5/0245; C09J 7/0217
(Continued)

(56) References Cited

U.S. PATENT DOCUMENTS

RE24,906 E    12/1960   Ulrich
3,772,262 A   11/1973   Clementi
(Continued)

FOREIGN PATENT DOCUMENTS

CN    1222180 A    7/1999
EP    0621326      10/1994
(Continued)

OTHER PUBLICATIONS

International Search Report for PCT International Application No. PCT/US2012/060952, dated Apr. 11, 2013, 3 pages.
(Continued)

*Primary Examiner* — Cachet I Sellman

(57) ABSTRACT

Articles with thin caliper melt coatings of high molecular weight, high viscosity materials and methods of making such coatings.

15 Claims, 2 Drawing Sheets

(51) Int. Cl.
*C09D 107/00* (2006.01)
*C09D 121/00* (2006.01)
*C09D 133/06* (2006.01)
*C09J 135/06* (2006.01)
*C09D 153/02* (2006.01)
*C09J 153/02* (2006.01)
*C09J 7/38* (2018.01)

(52) U.S. Cl.
CPC ......... *C09D 133/06* (2013.01); *C09D 153/02* (2013.01); *C09J 7/383* (2018.01); *C09J 7/385* (2018.01); *C09J 7/387* (2018.01); *C09J 135/06* (2013.01); *C09J 153/02* (2013.01); *B05C 5/0254* (2013.01); *C09J 2407/00* (2013.01); *C09J 2433/00* (2013.01); *C09J 2453/00* (2013.01); *Y10T 428/24446* (2015.01); *Y10T 428/273* (2015.01)

(58) Field of Classification Search
USPC ........ 427/208.1, 208.4, 208.2; 118/411–414, 118/419
See application file for complete search history.

(56) References Cited

U.S. PATENT DOCUMENTS

| | | | |
|---|---|---|---|
| 3,783,072 A | 1/1974 | Korpman | |
| 4,167,904 A | 9/1979 | Ferri | |
| 4,167,914 A * | 9/1979 | Mladota | B05C 11/025 118/33 |
| 4,181,752 A | 1/1980 | Martens | |
| 4,303,485 A | 12/1981 | Levens | |
| 4,329,384 A | 5/1982 | Vesley | |
| 4,330,590 A | 5/1982 | Vesley | |
| 4,379,201 A | 4/1983 | Heilmann | |
| 4,465,015 A | 8/1984 | Osta | |
| 4,554,324 A | 11/1985 | Husman | |
| 4,619,979 A | 10/1986 | Kotnour | |
| 4,693,776 A | 9/1987 | Krampe | |
| 4,737,559 A | 4/1988 | Kellen | |
| 4,757,782 A | 7/1988 | Pullinen | |
| 4,765,272 A | 8/1988 | Mladota | |
| 4,843,134 A | 6/1989 | Kotnour | |
| 4,871,593 A | 10/1989 | McIntyre | |
| 5,073,611 A | 12/1991 | Rehmer | |
| 5,078,081 A | 1/1992 | Kustermann | |
| 5,225,470 A | 7/1993 | Mancinelli | |
| 5,252,662 A | 10/1993 | Su | |
| 5,296,547 A | 3/1994 | Nestegard | |
| 5,539,033 A | 7/1996 | Bredahl | |
| 5,637,646 A | 6/1997 | Ellis | |
| 5,747,107 A | 5/1998 | Bayer, Jr. | |
| 5,749,972 A | 5/1998 | Bernert et al. | |
| 5,772,766 A | 6/1998 | Reich et al. | |
| 5,773,506 A | 6/1998 | Nestegard | |
| 5,804,610 A | 9/1998 | Hamer | |
| 5,843,529 A * | 12/1998 | Peiffer | B05C 11/025 118/123 |
| 5,858,150 A | 1/1999 | Yarusso | |
| 5,866,249 A | 2/1999 | Yarusso | |
| 6,077,351 A * | 6/2000 | Herzog | D21H 23/34 118/413 |
| 6,166,110 A | 12/2000 | Bredahl et al. | |
| 6,231,927 B1 * | 5/2001 | Ruid | B05D 1/42 118/123 |
| 6,293,037 B1 | 9/2001 | Spada et al. | |
| 6,632,522 B1 | 10/2003 | Hyde | |
| 6,720,387 B1 | 4/2004 | Stark | |
| 6,803,076 B2 * | 10/2004 | Loukusa | B05C 5/0254 118/413 |
| 6,815,008 B2 * | 11/2004 | Ichikawa | B05C 1/0826 118/118 |
| 6,875,506 B2 | 4/2005 | Husemann | |
| 6,881,442 B2 | 4/2005 | Husemann | |
| 7,455,897 B2 | 11/2008 | Loukusa | |
| 8,163,824 B2 | 4/2012 | Okazaki et al. | |
| 9,505,959 B2 | 11/2016 | Grittner et al. | |
| 2002/0090457 A1 | 7/2002 | Leonard | |
| 2005/0215964 A1 * | 9/2005 | Autran | A61F 13/15203 604/358 |
| 2007/0077422 A1 | 4/2007 | Ishiwatari et al. | |
| 2007/0223977 A1 * | 9/2007 | Matsubara | G03G 15/206 399/329 |
| 2010/0167050 A1 | 7/2010 | Husemann | |
| 2011/0256395 A1 | 10/2011 | Zmarsly et al. | |
| 2012/0315378 A1 * | 12/2012 | Yapel | B05C 5/0262 427/8 |

FOREIGN PATENT DOCUMENTS

| | | |
|---|---|---|
| EP | 0853092 | 7/1998 |
| EP | 1632532 | 3/2006 |
| EP | 1872861 | 1/2008 |
| EP | 2060327 | 5/2009 |
| JP | 09-104845 | 4/1997 |
| JP | H10-100341 A | 4/1998 |
| JP | 2003-041228 | 2/2003 |
| JP | 2003-292918 | 10/2003 |
| JP | 2005-105205 | 4/2005 |
| JP | 2005-314445 | 11/2005 |
| WO | WO 97-48777 | 12/1997 |

OTHER PUBLICATIONS

Rauwendaal, Mixing in Polymer Processing, 176-177 (1991).
Rauwendaal, Mixing in Polymer Processing, 185-186 (1991).
Satas, Handbook of Pressure Sensitive Adhesive Technology, 171-176; (1989).
Satas, Handbook of Pressure Sensitive Adhesive Technology, 77-79; (1989).
Satas, Handbook of Pressure Sensitive Adhesive Technology, 896-937 (1999).

* cited by examiner

ARTICLES WITH THIN MELT COATINGS AND METHODS FOR MAKING SAME

FIELD

This invention relates to articles with thin, i.e., low caliper, melt coatings, e.g., adhesive coatings, and methods for making such coatings.

BACKGROUND

A variety of coatings are applied to substrates with melt coating processes, i.e., processes where the material is heated to soften it such that it will flow and applying the material to a substrate where it is cooled to form a melt coated layer thereon.

A variety of methods for melt coating materials have been suggested. Illustrative examples include forward and reverse roll coating, slot die coating, extrusion draw (drop) die coating, extrusion contact die coating and extrusion calendar coating processes. Illustrative roll coating, slot die coating and extrusion calendar coating processes are described in "Handbook of Pressure Sensitive Adhesive Technology ($3^{rd}$ Edition)" edited by Donatas Satas (Satas & Associates, Warwick, R.I., 1999, pp. 896-937.

Low viscosity (i.e., less than about 50 Pa-s), low molecular weight (i.e., less than about 200,000 g/mol) hot melt coatable polymers such as waxes; hot melt glues/adhesives (e.g., polyamide, polyolefin and polyester); hot melt styrene block copolymer PSAs and low molecular weight drum pumpable (meth)acrylic ester PSAs are typically coated using roll coating and slot die coating methods. These materials are liquid-like in the molten state and do not require an extrusion pumping process to deliver the materials to the coating process. They may require an extrusion process to melt and/or mix the materials. The low coating weight limit for these methods is about 20 to about 25 g/m$^2$ and is dependent on many factors (e.g., molecular weight, extensional/elongational viscosity and shear viscosity).

High viscosity (i.e., more than about 50 Pa-s), high molecular weight (i.e., more than about 200,000 g/mol) hot melt coatable polymers are not liquid-like in the melt state due to the presence of polymer chain entanglements and require extrusion processes for mixing, pumping and coating operations. One illustrative coating method for such materials includes extrusion of the molten polymer out of a slot die into a nip formed by 2 rolls (which may have a conformable, e.g., rubber coating) and a moving substrate. If the molten polymer is tacky, the melt can be dropped onto a roller having a release coated surface and then laminated via nipping of the polymer melt to the moving substrate with a second rubber-covered roll. A second extrusion coating method is calendar coating which is described in the Satas reference. This method is suited for relatively high thickness hot melt coatings, i.e., greater than about 0.004 inches (100 μm), is relatively slow and requires extremely high nip pressures (more than about 3000 psi (20.7 megaPascals)). In a calendar coating operation, the coating composition and substrate are passed through affixed gap or nip in which they are squeezed together. An illustrative example of such processing is disclosed in U.S. Pat. No. 3,783,072 (Korpman).

U.S. Pat. No. 4,167,914 (Mladota) discloses an extrusion coater, sometimes referred to as press coated, for hot melt adhesive formulations that employs an elongated slot coating head with a small diameter rotating rod in cooperation with a larger diameter rotating compressible press roll. The rod and press roll are each rotated at predetermined speeds by motor. FIG. 1 is a derivation of a portion of FIG. 2 of U.S. Pat. No. 4,167,914 and shows some of the components shown there including elongated coating head 29 with chamber 45 connected to conduit 36 so that a supply of the viscous, hot melt, coating is pumped thereinto by a motorized pump (not shown) at a predetermined pressure and rate to meter the exact amount for extrusion through the elongated, narrow, extrusion slot 28 formed by lead-on lip, or edge, 46 and lead-off lip, or edge, 47. Web 22 is trained under the rubber like resilient surface 48 of press roll 49 which is supported, e.g., by pistons of air cylinders, to exert a predetermined pressure while also being yieldable. Cooperable with resilient surface 48 of press roll 49 and forming press roll nip 53 therewith is an elongated cylindrical rod 54 preferably having a hard smooth surface, the rod being rotatably seated for its major volume in groove 57 of substantially cylindrical cross-section in adjacent surface 58 of lead-off or downstream lip 47. Rod 54 is deeply seated in groove 57 such that only about the upper quarter of its volume is exposed. Rod 54 is mounted in its groove so that the pump pressure and rate causes a layer of coating composition to be applied to the face of web 22 as it is advanced under predetermined longitudinal and lateral tension from lead-on or upstream edge 46 to the curved hard face of rotating rod 54, the rod performing no metering function because it is revolved at relatively slow speed such as 9 to 12 rpm while the press roll and web advance at a considerably higher speed.

Other examples of web coating methods employing rotary rods are disclosed in U.S. Pat. No. 4,465,015 (Osta et al.) wherein a bar spaced from and trailing the delivery slit of the extrusion head is used as a spreader; U.S. Pat. No. 4,765,272 (Mladota) wherein a rotary doctor member, apparently not driven, is used to facilitate spreading of low viscosity compositions; and U.S. Pat. No. 4,757,782 (Pullinen) wherein a counter driven, i.e., in tangentially opposite direction, rotary rod is used as a smoothing device for low viscosity compositions.

Adhesives normally bond by surface attachment to other substances including various adherends and other adhesives. Pressure sensitive adhesives (PSAs) exhibit long term, preferably permanent, tackiness at ambient temperatures and will adhere to a variety of substrates upon application of light pressure, e.g., by finger or hand roller. An accepted quantitative description of a PSA is given by the Dahlquist criterion (see Handbook of Pressure-Sensitive Adhesive Technology, Second Edition, D. Satas, ed., Van Nostrand Reinhold, New York, N.Y., 1989, pages 171-176), which indicates that materials having a storage modulus (G') of less than about $3 \times 10^5$ Pascals (measured at 10 rad/sec at room temperature, i.e., about 22° C.) have PSA properties, while materials having a G' above this value do not. More specifically, a PSA as used herein refers to a material that has a storage modulus below the Dahlquist criterion at the use temperature, which may be different than room temperature.

PSAs are widely used in a vast array of applications. In a common configuration, coatings of PSA are provided on articles in desired locations. Illustrative examples include tabs, e.g., in sheet or strip form, or wound into roll form; self-adhesive sheets, e.g., note sheets, labels, sign sheeting, etc.; container closures; etc. A variety of adhesive formulations, offering a variety of performance, cost, and production criteria, have come to be used. Illustrative examples of materials from which PSA are made include acrylic polymers, thermoplastic elastomers, natural rubbers and synthetic rubbers, nonelastomeric thermoplastic polymers, etc.

Illustrative examples of methods for making PSA coatings or forming them on a desired surface include extrusion and solvent coating. Selection of a suitable method will be dependent in part upon the nature of the PSA formulation being used, nature of the substrate on which the coating is to be formed, available equipment and materials, etc.

Though various methods of making hot melt coatings are known, they are capable of producing satisfactory coating quality, i.e., as continuous as desired, only of coatings above certain thicknesses. The need exists to produce, at higher speeds, high quality melt coatings having lower thickness.

SUMMARY

The present invention provides articles with thin caliper melt coatings of high molecular weight, high viscosity materials and methods of making such articles. In some embodiments, particular advantages are achieved with PSA coatings.

Articles of the invention can be made in a variety of configurations with a variety of different melt coated formulations. Illustrative embodiments include pressure sensitive coatings and hot melt adhesive coatings. Illustrative examples of formulations that can be used in the present invention include acrylic polymers, thermoplastic elastomers, natural rubbers, synthetic rubbers, and nonelastic thermoplastic polymers.

Briefly summarizing, articles of the invention comprise a substrate having a first surface and a melt coated layer having a first major surface and a second major surface, the first major surface of the melt coated layer being disposed upon the first surface of the substrate. The melt coated layer is substantially continuous and exhibits desired properties, e.g., is a PSA, provides hot melt adhesion, etc. In accordance with the present invention, the melt coated layer is thinner than previously available coatings of such high molecular weight, high viscosity materials.

Melt coated layers of the invention may be formed from melt compositions selected from the group consisting of:

(a) one or more acrylic polymers having a collective molecular weight of at least about 200,000, wherein the composition, is free of solvents and contains no more than about 1% by weight of gelled acrylic polymer;

(b) one or more thermoplastic elastomers having a collective melt viscosity greater than about 20,000 cP, measured at any temperature suitable for hot-melt coating the composition and at shear rates less than 100 $sec^{-1}$ or frequencies less than 100 rad/sec;

(c) one or more natural rubbers or synthetic rubbers, none of which is a thermoplastic elastomer, having a collective molecular weight of at least about 200,000 g/mol and a collective melt viscosity greater than about 50,000 cP, measured at any temperature suitable for hot-melt coating the composition and at shear rates less than 100 $sec^{-1}$ or frequencies less than 100 rad/sec; and (d) one or more nonelastomeric thermoplastic polymers having a collective molecular weight of from about 50,000 to about 3,000,000 g/mol wherein the composition is free of solvents. The term collective is used herein to express that the indicated property, i.e., molecular weight or melt viscosity, is expressed for the entire subject coating composition.

In brief summary, methods of the invention comprise:

(a) conveying a molten coating composition as described herein through a die slot having a thickness less than about 30 mils (760 micrometers);

(b) melt coating the composition onto a substrate, e.g., directly contacting the molten composition to the entry side of a nip point between a rotating rod having a diameter less than about 3 inches (7.6 cm) and a moving substrate supported on a backup roller wherein the pressure of the nip point preferably causes deformation of the backup roller; and (c) obtaining a coated substrate on the exit side of the nip; wherein the rotating rod and the backup roller are each rotating in the direction of motion of the moving substrate, i.e., forward rotation; and wherein the rotating rod is rotating at greater than about 20 rpm, and has tangential surface speed that is from about 1 to about 20% of the tangential speed of the moving substrate.

It has been surprisingly found that by this process wherein the rotating rod is located in the delivery slot of the die, the rod acts as a metering device and the coating composition is "sheared down" and "smeared" on to the substrate in a manner that permits the formation of ultrathin melt coatings.

The method of the invention employs melt processing, i.e., application of heat and mechanical pressure on the composition and relative movement of the substrate, to extrude the coating composition into desired location and thickness on the substrate. Unlike previously known methods typically used for coating high molecular weight, high viscosity PSA and other compositions, no liquid carrier medium or solvent is used. As a result, no drying of the resultant coating is necessary, thereby eliminating potentially costly further operations, such as special drying and solvent recovery systems, as well as eliminating the risk that the substrate be exposed to potentially damaging post-coating treatments to the melt coated layer.

Applicants have found that the present invention can be used to make heretofore unattainably high quality coatings of PSA materials with selected high viscosity, high molecular weight materials. Another advantage of the invention is that the coatings can be made at heretofore unattainable combinations of high speed and very thin caliper. As a result, the invention enables for the first time high speed production of, for instance, articles with very thin PSA coatings. Resultant advantages include potential economies of scale in production of such articles, reduced cost of the resultant articles, and potential improved performance as the thickness of the PSA coating can be reduced to eliminate materials cost, improve other properties, e.g., weight, flexibility, etc. of the resultant article.

Although this description describes the method and articles of the invention with reference to PSA coatings, it should be understood that advantages of the invention can be attained using other melt coatings. Illustrative examples include thin bonding layers, e.g., thermoplastic adhesive layers, thin elastomeric layers, e.g., thermoplastic elastomers (TPE), and conformable layers.

The present invention extends the range of melt coating thickness which can be achieved for polymeric materials, particularly for materials having high molecular weight, e.g., above 200,000 g/mol, high melt viscosity, e.g., above 50 Pa·s. It has been surprisingly found that continuous coatings of such materials having very low thickness can be achieved. Accordingly, the present invention provides heretofore unattainable significant potential cost savings, reduced materials consumption and enhanced sustainability. In addition, the present invention makes thinner, lighter products possible.

Typically, melt coatings of the invention are substantially continuous, i.e., free of pin hole type defects. In some embodiments, melt coatings of the invention have a microtextured surface (i.e., the side opposite to the side contacting the substrate). Such melt coatings can exhibit a significantly lower coating density than coatings of the same material which have smooth surfaces, i.e., substantially uniform thickness. Coatings of the invention can typically exhibit a coating density that is from about 60 to about 95% of the coating density of smooth edged coatings of the same material, thus providing adhesive performance with less cost. In addition to having greater thicknesses, i.e., having greater coating weights, coatings resultant of the methods disclosed in U.S. Pat. No. 4,167,914 would exhibit a coating density on the order of 95 to 100% of smooth edged coatings of the same material.

BRIEF DESCRIPTION OF DRAWING

The invention is further explained with reference to the drawing wherein.

Figure 1:
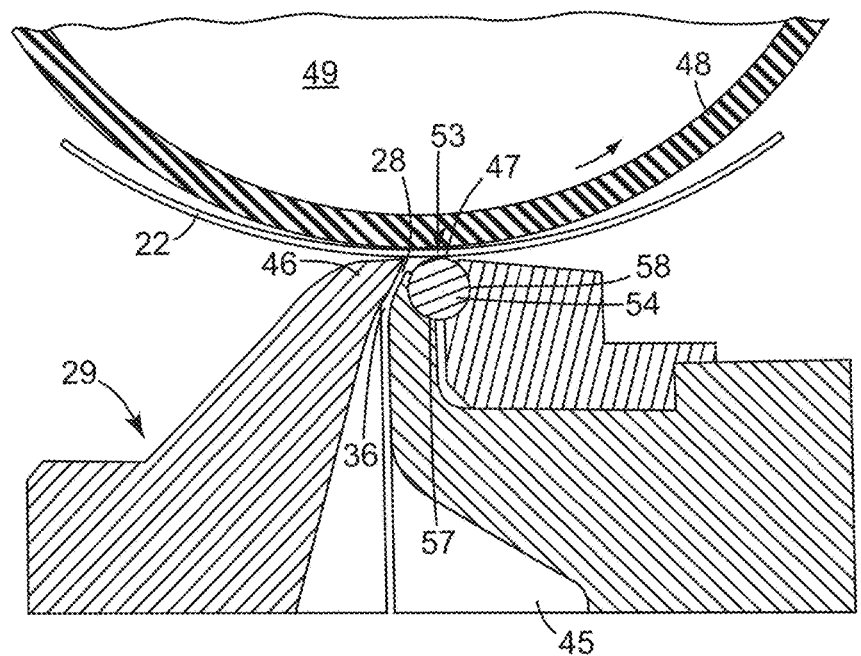
FIG. 1 is a fragmentary side elevation of the coating head, press roll, rotating rod, and rod seat of the prior art.

These figures are not to scale and are intended to be merely illustrative and not limiting.

KEY AND GLOSSARY

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include plural referents unless the content clearly dictates otherwise. For example, reference to a composition containing "a compound" also includes a mixture of two or more compounds. As used in this specification and the appended claims, the term "or" is generally employed in its sense including "and/or" unless the content clearly dictates otherwise.

For the following defined terms, these definitions shall be applied, unless a different definition is given in the claims or elsewhere in this specification.

"Aliphatic" means a cyclic, linear, or branched saturated mono- or polyvalent hydrocarbon radical.

"Alkyl" means a linear saturated monovalent hydrocarbon radical having from one to about twelve carbon atoms or a cyclic or branched saturated monovalent hydrocarbon radical having from three to about twelve carbon atoms, e.g., methyl, ethyl, 1-propyl, 2-propyl, pentyl, and the like.

"Alkylene" means a linear saturated divalent hydrocarbon radical having from one to about twelve carbon atoms or a cyclic or branched saturated divalent hydrocarbon radical having from three to about twelve carbon atoms, e.g., methylene, ethylene, propylene, 2-methylpropylene, pentylene, hexylene, and the like.

"Major" and "minor" amounts mean that there is more of the major amount than of the minor amount.

"(Meth)acrylate" means acrylate and/or methacrylate.

"Polymer" means and includes polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The Following Abbreviations are Used in this Description:

AA acrylic acid
BOPP biaxially oriented polypropylene
BOPET biaxially oriented polyethylene terephthalate
C centigrade
cc cubic centimer(s)
cm centimeter(s)
DMA dynamic mechanical analysis
g gram(s)
GPC gel permeation chromatography
gsm grains/m$^2$
HPLC high pressure liquid chromatography
IOA isooctyl acrylate
IOTG isooctyl thioglycolate
Kg kilogram(s)
kV kilovolt(s)
LAB low adhesion backsize
Lb. pound(s)
m meter(s)
MD machine direction
mL milliliter(s)
mm millimeter(s)
mrad megarads
Mw weight average molecular weight
N Newton
NR natural rubber
Pa-s Pascal-second(s)
pphm parts per hundred million
PSA pressure sensitive adhesive
PTFE polytetrafluoroethylene
rad/sec radian/second
rev revolution
rpm revolution(s)/minute
SI styrene-isoprene
SIC strain-induced crystallization
TD cross or transverse direction
THF tetrahydrofuran
TPE thermoplastic elastomer
TSE twin screw extruder
UV-C ultraviolet C band
μL microliter(s)
μm micron(s)

DETAILED DESCRIPTION OF ILLUSTRATIVE EMBODIMENTS

Application of coating compositions to a substrate in accordance with the invention typically includes both mixing and coating steps. Depending on the equipment and techniques used, both processing steps may take place in a single integrated compounding and coating line. However, this is not necessary for practice of the present invention. Those skilled in the art will be able to readily select suitable equipment and processing parameters dependent in part upon the nature of the component materials being used.

Mixing

The present invention can use either batch or continuous compounding processes to yield uniform mixture melt coating compositions, i.e., compositions in which the domain sizes of both miscible components and immiscible components is less than about 0.1 μm. For batch or continuous compounding, the components may be compounded using, for example, physical blending.

Physical blending devices that provide dispersive mixing, distributive mixing, or a combination of dispersive and distributive mixing are also useful in preparing the hot melt coatable materials of the invention. As described above, both batch and continuous methods of physical blending can be used. Examples of batch methods include using the following equipment: BRABENDER (using a BRABENDER PREP-CENTER® unit, from C.W. Brabender Instruments, Inc., South Hackensack, N.J.) or BANBURY™ internal mixing and roll milling (using equipment from FARREL COMPANY, Ansonia, CT).

Preferably, a continuous compounding process is used to prepare the hot melt coatable materials of the invention. Illustrative examples of continuous methods include those using the following types of equipment and processing: single screw extruding, twin screw extruding, disk extruding, reciprocating single screw extruding, and pin barrel single screw extruding. The continuous methods can include utilizing both distributive elements, such as cavity transfer elements (e.g., CTM, from Rapra Technology Ltd., Shrewsbury, England) and pin mixing elements, static mixing elements and dispersive elements (e.g., MADDOCK mixing elements or SAXTON mixing elements as described in "Mixing in Single-Screw Extruders," Mixing in Polymer Processing, edited by Chris Rauwendaal (Marcel Dekker Inc.: New York (1991), pp. 129, 176-177, and 185-186).

Continuous compounding is particularly advantageous in order to achieve relatively high throughput rates where the components of PSA coating compositions have widely different viscosities and molecular weights. For high throughput rates, melting, mixing, and mastication should preferably occur quickly.

A number of suitable continuous compounding devices are known. Continuous compounding devices may comprise a single unit or a series of interconnected units. An illustrative example of a continuous compounding device useful in the present invention is a twin screw extruder having a sequential series of conveying and processing sections, such as that described in U.S. Pat. No. 5,539,033 (Bredahl et al.).

A plurality of input openings can be provided along the length of a continuous extruder to facilitate the addition of various components of the hot melt coatable materials, such as thermoplastic elastomers, thermoplastics, non-thermoplastic elastomers, (meth)acrylate (co)polymers, tackifiers, plasticizers and other additives known in the art. Additions of materials that are solids at the addition temperature or solids when added are made through input ports to a partially full conveying section. Additions of materials that are liquids at the addition temperature or liquids when added may be made at any available access port to the melt. A melt pump and filter may be present, either as an integral part of the extruder or as a separate unit, to facilitate both the removal of the adhesive from the continuous compounding device and the removal of unwanted contaminants from the adhesive stream.

The hot melt coatable materials can be continuously mixed and pumped to the coating operation or pumped into a secondary vessel such as a drum for transportation and later re-processing.

Coating

Figure 2:
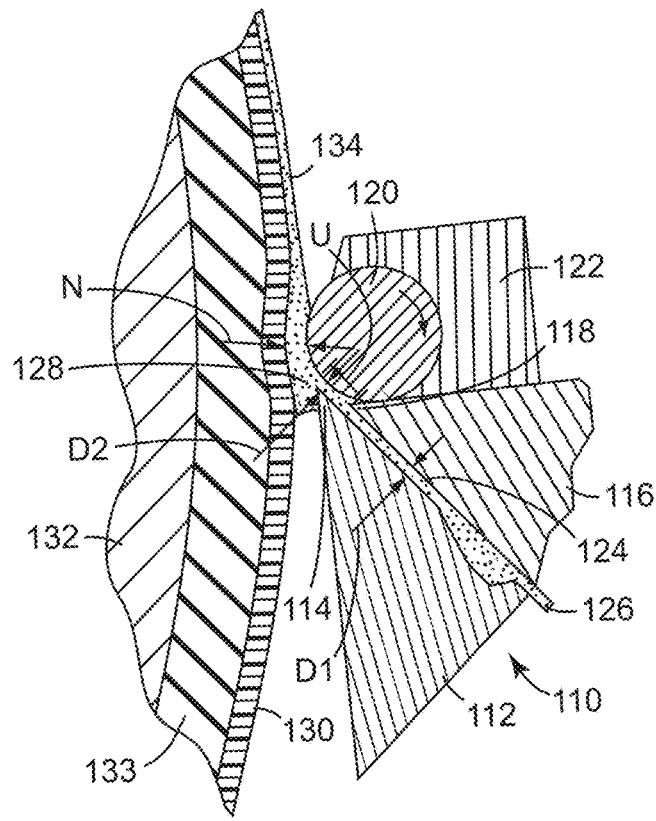
FIG. 2 is a fragmentary side elevation of the coating head, press roll, rotating rod, and rod seat of the method of the invention.

An illustrative coating apparatus of the invention is shown in FIG. 2. Die head 110 comprises elongated upstream or leading bar 112 with edge 114, elongated downstream or trailing bar 116 with edge 118, elongated rod 120, and rod seat 122. Leading bar 112 and trailing bar 116 are spaced apart to define slot 124. Leading bar 112 and trailing bar 116 are configured such that edge 114 protrudes beyond edge 118 to define underbite U. Edge tip 118 of trailing bar 116 ends in a substantially tangential arrangement with rod 120. Rod 120 and bar 112 are positioned such that gap D2 between leading die tip 114 and rod 120 is less than or substantially equal to the width D1 of the die slot 124, i.e., dimension between bars 112 and 116. Gap D2, sometimes referred to herein as the die slot is the die exit point at which the flow of the coating composition is no longer constrained by the die. Gap D2 is typically from about 0.005 to about 0.035 inch (0.13 to 0.9 mm) Gap D1 is typically from about 0.005 to about 0.070 inch (0.13 to 1.8 mm) Gap D2 can be of a fixed distance extending back towards the distribution manifold, or of a varying distance. There can be a discontinuity of gap as it transitions from the rod seat and the rod itself, or it can be of a fixed or monotonically decreasing distance. As is well known in the art, the parameters of the gap will affect the pressure drop in this section of the die. Typically die head 110 is oriented such that rod 120 is closer to substrate 130 than is edge tip 114 forming pressure nip N.

In contrast, as shown in FIG. 1, in the apparatus of U.S. Pat. No. 4,167,914 the tip of trailing edge edge 47 ends with a dramatic expansion of the gap such that a reservoir of melt coating formulation is formed leading into nip 53.

In the present invention, hot melt coatable polymer composition 126 is pumped into die head 110 through slot 124 to be metered out of the gap formed between edge 114 and rod 120. During coating, composition 126 is first metered by action of rod 120 and edge 114 then smeared onto web 130 by rod 120 at nip N. During coating operation, a continuous coating bead 128 is typically formed. As web 130 supported on backup roll 132 with rubber covering 133 moves beyond coating die 110, melt coat 134 has been formed thereon. As will be understood, the size and shape of coating bead 128 will depend in part upon distance between the die head 110 and backup roll 132, the dimension of the portion of rod 120 extending beyond edge tip 114, and the angle of die head 110 to backup roll 132.

Edge tips 114 and 118 should be clean and free of nicks and burrs, and should be straight within 1 micron in 25 cm of length. An advantage of the present invention is that the service life of components will typically be longer because the shear load on the rod, die edges, etc. is reduced.

In typical embodiments, the backup roll 132 has a diameter from about 8 to about 16 inches (20 to 40 cm).

Although backup roll 132 may be substantially incompressible, it is typically resilient so as to deform slightly at the nip point. Such deformation, sometimes referred to as die penetration, facilitates achieving desired uniform contact of the coating bead to the substrate, particularly with large apparatus in which the elongated die slot, rod, etc. may be several feet wide. Illustrative examples include backup rolls made of silicone rubber or having a rubber covering to facilitate cleaning of melt residue. If the backup roll is too soft, the roll will tend to deform excessively during coating, leading to permanent deformations in the roll and unacceptable non-uniformities in the resultant coating. In typical embodiments of the invention, backup rolls having a Shore A hardness of from about 50 to about 90 durometer or more will be used.

In typical embodiments, the surface of backup roller 132 is deformed to a depth of from about 1 to about 25 mils (25 to 635 micrometers). If desired, operation parameters are selected to limit the depth of deformation of backup roller 132 to no more than about 10 mils (380 micrometers) in some instances, no more than about 5 mils (125 micrometers) in other instances, and no more than about 1 mil (25 micrometers) in still other instances. Reducing the amount of penetration to the minimum amount necessary to achieve uniform contact permits the use of relatively thin, lower tear or tensile strength substrates in the invention.

To facilitate control of temperature during coating, the backup roller may be chilled or heated as desired.

In typical embodiments, rod 120 has a diameter from about 0.125 and 1 inch (0.3 to 2.5 cm).

Rod 120 may be smooth or have a textured surface. In some embodiments, the rod is smooth or has a surface texture having a value of $R_A$ less than about 1000 microinches (25 μm). In other instances the rotating has a surface texture having a value of $R_A$ less than about 100 microinches (2.5 μm), and in other instances the rod has a surface texture having a value of $R_A$ less than about 20 microinches (0.5 μm).

In operation, the rod acts first as a metering device then to smear the composition on the substrate. The rod is rotated at a speed greater than about 20 rpm so as to have an effective surface speed that is from about 1 to about 20%, preferably from about 3 to about 8%, of the speed of the moving substrate. If the rod rotation is too slow, melt coating composition will back up and result in coating voids or non-coated regions on the moving substrate whereas if the rod rotation is too fast coating defects result, e.g., chatter pattern, that may lead to discontinuities in the resultant coating.

The method of the invention can be carried out at high speed, making it suitable for industrial scale products. For instance, typically the process can be carried out with web 130 moving through nip N at speeds of over about 200 feet/minute (60 meters/minute). In some embodiments, it moves at speeds of over about 500 feet/minute (150 meters/minute), and in some embodiments the web moves through nip N at speeds of over about 1000 feet/minute (300 meters/minutes).

As in U.S. Pat. No. 4,167,914, the rotation of the rod serves to spread wear and free any particles lodged in the nip and the rod rotation is not for metering purposes but for spreading wear while overcoming any streaking. The rod acts to knife off the molten polymer and the coating thickness depends on coating speed, polymer melt viscosity, polymer extensional/elongational viscosity, nip pressure, etc. The molten polymer is metered in the coating nip and the remainder of the uncoated polymer melt forms a recirculating (rolling) bank upstream from the rod, similar to a calendaring operation. The main limitation on coating speed and thickness is the shear and extensional/elongational viscosity which is a function of the hot melt coatable polymer molecular weight. If the molecular weight is too high, the coating speed and achievable low coating thickness will be limited by coating defects including thick edge beads. These defects can be surface defects (e.g., herringbone, chevrons, etc.) or coating voids.

As compared to U.S. Pat. No. 4,167,914, a relatively lower nip pressure is used. Preferably the rotating rod is indexed to provide penetration with or contact to the substrate and backup roll only as necessary to provide uniform contact therewith. If the nip pressure is too low, the melt coating composition will not wet out effectively on the substrate resulting in defective coating performance. If the nip pressure is too high, the resultant coating will have "coating outs", i.e., holes, and other coating defects may result.

The hot melt coating process of the invention is an extrusion coating method that is a modification of the rotary-rod die slot extrusion described above with specific process changes. The rotational speed of the rod in combination with the thickness of the molten polymer film supplied by the die slot and lower coating nip pressures resulting from lower penetration of the rotating rod/molten polymer film into the moving substrate and rubber-covered back-up roll substantially opens up the coating window with respect to melt viscosity, melt temperature, coating speed and low coating thickness limit. The rotating rod coupled with the thin (e.g., less than about 0.030 inch (760 micrometers)) polymer melt film and low coating nip pressure (penetration into back up roll) act to precisely meter the hot melt coatable polymers of the invention. The rotational speed of the rod in the forward direction is typically from about 1 to about 20 percent of the moving substrate to provide a uniform coating thickness and minimal edge beads.

An advantage of the present invention is that desired flow of the coating composition to achieve flow onto the substrate as desired is achieved through application of heat and pressure to the composition. Unlike traditional liquid medium coating operations where a liquid medium, e.g., water or a volatile organic solvent, is used to achieve flow of the coating composition and must be removed from resultant coated layer, e.g., by drying, the coating compositions used in the present invention can be substantially free of liquid medium and no post coating drying operations are used.

Another advantage of the method of the present invention over the disclosure of U.S. Pat. No. 4,167,914 is that coatings can be formed with minimal or no edge bead (i.e., thickened portion of the deposited melt coated material at the edge of the coating zone) as compared to the coatings produced in accordance with the reference. When making coatings in accordance with the reference, edges with pronounced edge beads result, e.g., zones on each coating edge which can constitute up to 10% or more of the total width of the coating, are formed. To eliminate such beads and the disruptive performance they provide, it is common to remove the lateral edge portions, e.g., via slitting, resulting in a significant waste stream. In contrast, the method of the invention produce resultant product with coatings that have minimal or no edge bead, thus greatly diminishing or even eliminating the waste.

Figure 3:
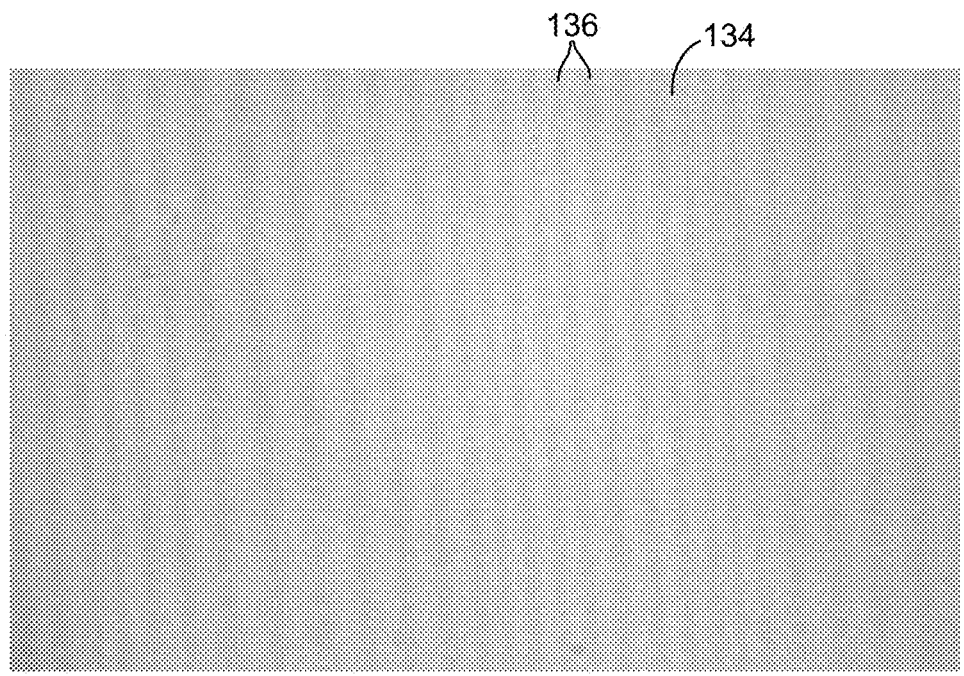
FIG. 3 is a photomicrograph of the exposed surface of the melt coated layer of an article of the invention.
Figure 4:
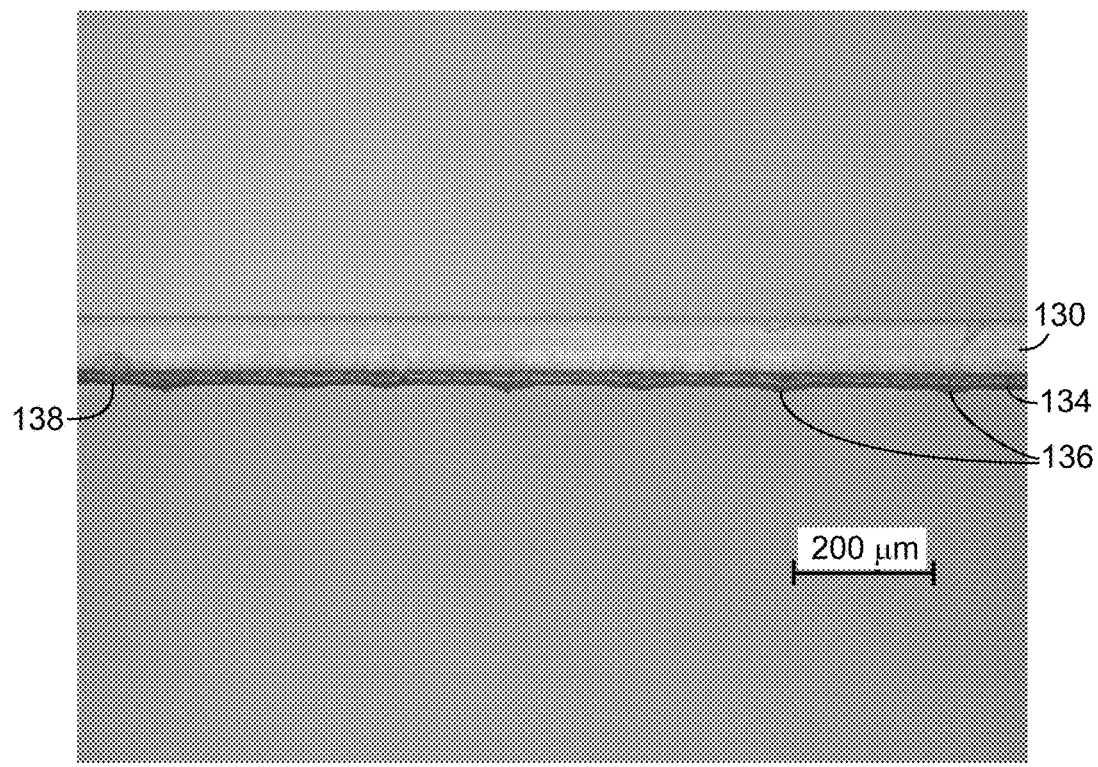
FIG. 4 is a photomicrograph of the edge of an article of the invention.

In some embodiments, melt coatings of the invention have a micro-textured surface (opposite to the side contacting the substrate) comprising several striations of relatively thicker and thinner coating thickness which extent in the machine direction. Such resultant coatings can exhibit a significantly lower coating density than coatings of the same material which have smooth surfaces, i.e., substantially uniform thickness. Coatings of the invention can typically exhibit a coating density that is from about 60 to about 95% of the coating density of smooth surfaced coatings of the same material. Coatings resultant of the methods disclosed in Mladota would exhibit a coating density on the order of 95 to 100% of smooth edged coatings of the same material. The variation in coating thickness can be evaluated by optical means, e.g., measuring comparative gloss of the resultant coating, and by direct physical means, e.g., measuring thickness with a caliper. Examples of such striations are visible in FIGS. 3 and 4 where striations 136 on surface 138 of melt coating 134 on web 130 are visible. Though such striations may tend to diminish as the melt coating relaxes, especially if the coated article is subjected to compression, e.g., as wound into roll form, residual alignment of coated material will often be observable.

Coating Composition

Melt coatable compositions that can be used in the invention include those selected from the group consisting of:

(a) one or more acrylic polymers having a collective molecular weight of at least about 200,000, wherein the composition is free of solvents and contains no more than about 1% by weight of gelled acrylic polymer;

(b) one or more thermoplastic elastomers having a collective melt viscosity measured at any temperature suitable for hot-melt coating and at shear rates less than 100 sec$^{-1}$ or frequencies less than 100 rad/sec is greater than about 20,000 cP;

(c) one or more natural rubbers or synthetic rubbers, none of which is a thermoplastic elastomer, having a collective molecular weight of at least about 200,000 g/mol and a melt viscosity greater than about 50,000 cP measured at any temperature suitable for hot-melt coating and at shear rates less than 100 sec$^{-1}$ or frequencies less than 100 rad/sec; and (d) one or more nonelastomeric thermoplastic polymers having a collective molecular weight of from about 50,000 to about 3,000,000 g/mol, wherein composition is free of solvents.

If desired, one or more suitable additives can be added to change the properties of the resultant melt coated layer. Illustrative examples of such additives include pigments, fillers such as glass or polymeric bubbles or beads (which may be expanded or unexpanded), hydrophobic or hydrophilic silica, calcium carbonate, glass or synthetic fibers, chemical and physical foaming (blowing) agents, toughening agents, reinforcing agents, fire retardants, antioxidants, and stabilizers. The additives are added in amounts sufficient to obtain the desired end properties.

(a) Acrylic Polymers

In some embodiments, the melt coated layer comprises one or more acrylic polymers having a molecular weight of at least about 200,000 and has a coating weight less than about 25 g/m$^2$. In some such embodiments, the melt coated layer is substantially free of tackifiers, oils, and plasticizers. If desired, the melt coated layer of such embodiments may have a coating weight less than about 21 g/m$^2$, less than about 17 g/m$^2$, less than about 13 g/m$^2$, or even less than about 9 g/m$^2$ In embodiments wherein the melt coated layer comprises one or more acrylic polymers, the acrylic polymers may have a collective molecular weight of at least about 500,000, at least about 800,000 in some instances, and even at least about 1,000,000 if desired.

If desired, the melt coated layer may consist essentially of one or more acrylic polymers. In some embodiments, the melt coated layer comprises acrylic polymer selected from the group consisting of polymers and copolymers of isooctyl acrylate. Other acrylic polymers that may be used in the invention are described below.

Low $T_g$ (Meth)Acrylate Monomers. A class of polymeric materials that can be coated by the process of the invention is the hot melt coatable (meth)acrylic ester (co)polymers. The hot melt (meth)acrylic ester (co)polymer contains one or more low $T_g$ (meth)acrylate monomers. Examples of useful low $T_g$ (meth)acrylate monomers include mono-functional unsaturated monomers selected from the group consisting of (meth)acrylate esters of non-tertiary alkyl alcohols, the alkyl groups of which comprise from about 1 to about 18, preferably about 4 to about 12 carbon atoms. Preferred (meth)acrylate monomers, when homo-polymerized, have a $T_g$ below about 20° C. and have the following general Formula (I):

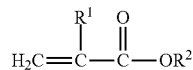

Formula (I)

wherein $R_1$ is H or $CH_3$. An acrylate monomer is indicated when $R_1$ is H and a methacrylate monomer is indicated when $R_1$ is $CH_3$. $R_2$ is broadly selected from linear, branched, aromatic, or cyclic hydrocarbon groups. Preferably, $R_2$ is a linear or branched hydrocarbon group. The number of carbon atoms in the hydrocarbon group is preferably about 1 to about 20, and more preferably about 1 to about 18. When $R_2$ is a hydrocarbon group it can also include heteroatoms (e.g., oxygen or sulfur).

Examples of suitable low $T_g$ (meth)acrylate monomers useful in the present invention include, but are not limited to, benzyl acrylate, n-butyl acrylate, n-butyl methacrylate, sec-butyl acrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, 2-ethylhexyl methacrylate, n-hexadecyl methacrylate, n-hexyl methacrylate, isoamyl acrylate, isobutyl acrylate, isodecyl acrylate, isodecyl methacrylate, isononyl acrylate, isooctyl acrylate, isooctyl methacrylate, isopropyl acrylate, isotridecyl acrylate, lauryl acrylate, lauryl methacrylate, 2-methoxy ethyl acrylate, methyl acrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-octyl acrylate, 2-octyl methacrylate, 2-phenoxy ethyl methacrylate, propyl acrylate, n-tetradecyl acrylate, n-tetradecyl methacrylate and mixtures thereof.

High $T_g$ Monomers. The hot melt coatable (meth)acrylic ester (co)polymer can include one or more high $T_g$ monomers. The high $T_g$ monomers of the present invention are preferably mono-ethylenically unsaturated monomers having a homopolymer $T_g$ greater than about 20° C., most preferably greater than about 50° C. and can be copolymerized with the low $T_g$ (meth)acrylate monomers described previously. Examples of suitable high $T_g$ monomers include one or more, but are not limited to, substituted lower ($C_1$ to $C_4$) alkyl methacrylates such as methyl methacrylate, ethyl methacrylate and tert-butyl methacrylate; n-hexadecyl acrylate, n-hexyl acrylate, 2-hydroxyethyl methacrylate and isobutyl methacrylate; vinyl esters such as vinyl acetate, vinyl pivalate; and vinyl neononanoate; acrylate and methacrylate esters of cycloalkyl; aromatic or bridged cycloalkyl alcohols such as benzyl methacrylate, isobornyl acrylate, isobornyl methacrylate, 4-t-butylcyclohexyl methacrylate, cyclohexyl methacrylate, phenyl acrylate, phenylmethacrylate, 2-naphthyl acrylate, and 2-naphthyl methacrylate and styrene and substituted styrene derivatives such as alpha-methyl styrene. Other useful (meth)acrylic ester (co)polymers include vinyl-terminated polymeric monomers (so called "macromolecular monomers" or "macromers") described in U.S. Pat. No. 4,554,324 (Husman et al.) and U.S. Pat. No. 4,693,776 (Krampe et al.) and include moieties having a $T_g$ greater than about 20° C. and weight average molecular weight (Mw) in the range of about 2,000 g/mole to about 30,000 g/mole. Useful polymeric moieties include vinyl aromatic polymers such polystyrene, poly(alpha-methylstyrene), poly(vinyl-toluene) and its isomers or non-aromatic vinyl polymers such as poly(methylmethacrylate).

Polar Monomers. The optional polar monomers also contribute to the mechanical properties of the hot melt (meth) acrylic ester (co)polymer. In addition, such polar monomers enhance internal reinforcement and surface affinity of the resultant (meth)acrylic ester (co)polymer composition. Useful acidic polar monomers include one or more, but are not limited to, those selected from mono-ethylenically unsaturated carboxylic acids, sulfonic acids, phosphonic acids and mixtures thereof. Examples of such compounds include those selected from acrylic acid, methacrylic acid, itaconic acid, fumaric acid, crotonic acid, citraconic acid, maleic acid, oleic acid, β-carboxyethyl acrylate, 2-sulfoethyl methacrylate, styrene sulfonic acid, 2-acrylamido-2-methylpropane sulfonic acid, vinyl phosphonic acid, and the like and mixtures thereof. Due to their availability, particularly preferred acidic polar monomers are the mono-ethylenically unsaturated carboxylic acids. When even stronger acids are desired, particularly preferred acidic polar monomers include the ethylenically unsaturated sulfonic acids and ethylenically unsaturated phosphonic acids. Other useful polar monomers include N-vinyl lactams such as N-vinyl pyrrolidone; N-vinyl caprolactam; substituted (meth)acrylamides such as N,N-dimethylacrylamide, N,N-dimethyl methacrylamide, N,N-diethylacrylamide, N,N-diethyl methacrylamide, N-tert-octylacrylamide and N-isopropylacrylamide; (meth)acrylonitrile and maleic anhydride.

If the (meth)acrylic ester (co)polymer requires PSA characteristics, then a corresponding homopolymer or copolymer can be tailored to have a resultant glass transition temperature ($T_g$) of less than about 0° C. The PSA should have physical properties in accordance with those described in the "Handbook of Pressure Sensitive Adhesive Technology ($2^{nd}$ Edition)" by Donatas Satas (van Nostrand, New York, 1989). Particularly preferred PSA (co)polymers are (meth)acrylic ester (co)polymers. Such (co)polymers typically are derived from monomers comprising about 40% by weight to about 98% by weight, preferably at least about 70% by weight, more preferably at least about 85% by weight, most preferably about 90% by weight, of at least one low $T_g$ alkyl (meth)acrylate monomer that, as a homopolymer, has a $T_g$ of less than about 0° C. and preferably less than about −20° C. Polar (meth)acrylic ester copolymers typically are derived from monomers comprising about 2% by weight to about 30% by weight, preferably about 2% by weight to about 15% by weight, of a copolymerizable polar monomer. Optionally, other vinyl monomers and high $T_g$ alkyl (meth)acrylate monomers which, as homopolymers, have a $T_g$ greater than 20° C. may be utilized in conjunction with one or more of the low $T_g$ alkyl (meth)acrylate monomers and polar monomers, provided that the $T_g$ of the resultant (meth)acrylic ester copolymer is less than about 0° C.

Polymerization Methods. In the practice of the invention, the (meth)acrylic ester (co)polymers can be polymerized by techniques including, but not limited to, the conventional techniques of solvent polymerization, dispersion polymerization, emulsion polymerization, suspension polymerization, solventless bulk polymerization and radiation polymerization, including processes using ultraviolet light, electron beam and gamma radiation. The starting materials may comprise a polymerization initiator, especially a thermal initiator or a photoinitiator of a type and in an amount effective to polymerize the monomers of the (meth)acrylic ester (co)polymer.

Solvent Polymerization Method. Solvent polymerization is well known in the art and described in various sources such as U.S. Pat. No. Re 24,906 (Ulrich) and U.S. Pat. No. 4,554,324 (Husman et al.). Briefly, the procedure is carried out by adding the monomers, a suitable solvent such as ethyl acetate, and an optional chain transfer agent to a reaction vessel, adding a free radical initiator, purging with nitrogen, and maintaining the reaction vessel at an elevated temperature, typically in the range of about 40° C. to about 100° C. until the reaction is completed, typically in about 1 to about 20 hours, depending upon the batch size and temperature. Suitable free radical initiators are commercially available such as those from DuPont Company under the VAZO trade name designation. Specific examples include VAZO™ 64 (2,2'-azobis(isobutyroniltrile) and VAZO™ 52. Suitable initiators also include hydroperoxides, such as tert-butyl hydroperoxide, and peroxides, such as benzoyl peroxide and cyclohexane peroxide.

Dispersion Polymerization Method. Dispersion polymerization typically is carried out as single-phase reaction mixture consisting of a solution of monomers, initiator and steric stabilizer in a solvent that does not dissolve the resulting polymer. The initial stage of the polymerization is a typical solution polymerization and the polymer chains grow in size until they become insoluble in the reaction mixture. As the polymer starts to precipitate out of the mixture, the steric stabilizer adsorbs on the surface of the polymer preventing coalescence of the polymer particles as they form. The reaction will continue until all the monomer is consumed resulting in the formation of polymer particles insoluble in the reaction medium they were formed in.

Emulsion Polymerization Method. Emulsion polymerization is also described in U.S. Pat. No. Re 24,906 in which the monomers are added to distilled water with an emulsifying agent and suitable initiators in a reaction vessel, purged with nitrogen, and heated with agitation, typically to a temperature in the range of about 25° C. to about 80° C., until the reaction is completed.

For ease of handling and/or to employ emulsion polymerized (meth)acrylic ester (co)polymers as solid materials or coatable, dispersible powders, the emulsion polymerized (meth)acrylic ester (co)polymer can be spray dried using conventional drying techniques. To prepare such powders, the emulsion polymerized base copolymer can be fed to a nozzle that sprays the emulsion into a stream of hot gas. The aqueous emulsion medium evaporates first, forming a small droplet of concentrated base copolymer. As aqueous medium removal nears completion, the droplet is transformed into a powder particle. See for example, U.S. Pat. No. 3,772,262 (Clementi) or K. Masters, "Spray Drying", 2nd ed., Wiley: 1976.

Suspension Polymerization Method. The (meth)acrylic ester (co)polymer can also be prepared in bead form using suspension polymerization methods. Such suspension methods are described, for example, in European Patent Appl. No. 853092 (Bogaert et al.). This suspension process involves mixing the low $T_g$ (meth)acrylate monomers, high $T_g$ monomers, polar monomers, free radical initiator, chain transfer agent and other desired additives to form a premix. A suspension stabilizer such as dextrin or a dextrin derivative is combined with water and then with the premix to form an oil in water suspension. The resulting suspension typically comprises from about 10 to about 50 weight percent premix and from about 90 to about 50 weight percent water phase. Polymerization is then initiated, typically thermally, and carried out for about 2 to about 16 hours at a temperature from about 40° C. to about 90° C. The (meth)acrylic ester (co)polymer beads can be isolated by a variety of means and generally have a diameter of about 1 to about 5000 microns. Similar to the emulsion process, smaller particles can be spray-dried to recover the (meth)acrylic ester (co)polymer. Larger particles can be isolated, for example, by simple filtration and air-dried.

Solventless Polymerization Processes. Solventless polymerization methods, such as the continuous free radical polymerization method described in U.S. Pat. Nos. 4,619,979 and 4,843,134 (both Kotnour et al.); the essentially adiabatic polymerization methods using a batch reactor described in U.S. Pat. No. 5,637,646 (Ellis) and the methods described for polymerizing packaged pre-adhesive compositions described in U.S. Pat. No. 5,804,610 (Hamer et al.) may also be utilized to prepare the (meth)acrylic ester (co)polymers.

In one preferred embodiment of this latter method, from 0.1 to about 500 grams of the polymerizable mixture comprising low $T_g$ (meth)acrylate monomer(s), high $T_g$ monomer(s), polar monomer(s), initiator, and optional chain transfer agent is completely surrounded by a packaging material. In another preferred embodiment, the pre-adhesive composition is disposed on the surface of a sheet, or between a pair of two substantially parallel sheets.

The packaging material is made of a material that when combined with the (meth)acrylic ester (co)polymer or plasticized PSA composition does not substantially adversely affect the desired PSA characteristics. A hot melt coated PSA produced from a mixture of the pressure sensitive adhesive and the packaging material may have improved PSA properties compared to hot melt coated PSA produced from the PSA alone.

The packaging material should be appropriate for the polymerization method used. For example, with photopolymerization, it is necessary to use a film material that is sufficiently transparent to ultraviolet radiation at the wavelengths necessary to effect polymerization. Polymerization can be effected by exposure to ultraviolet (UV) radiation as described in U.S. Pat. No. 4,181,752 (Martens et al.). In a preferred embodiment, the polymerization is carried out with UV black lights having over about 60 percent, and preferably over about 75 percent of their emission spectra from about 280 to about 400 nanometers (nm), with intensity from about 0.1 to about 25 mW/cm$^2$.

In another preferred solventless polymerization method, the (meth)acrylic ester (co)polymers of the present invention are prepared by photoinitiated polymerization methods according to the technique described in U.S. Pat. No. 4,181,752. The low $T_g$ (meth)acrylate monomer(s), high $T_g$ monomer(s), polar monomer(s) and photoinitiator are mixed together in the absence of solvent and partially polymerized to a viscosity in the range of from about 500 cps to about 50,000 cps to achieve a coatable syrup. Alternatively, the monomers and photoinitiator are mixed in the absence of solvent and partially polymerized to make syrup. In yet another way, the monomers, and plasticizing agent may be mixed with a thixotropic agent such as fumed hydrophilic silica to achieve a coatable thickness. The UV cross-linking agent and any other ingredients are then added to the pre-polymerized syrup or thickened plasticized monomer mixture. Alternatively, these ingredients (with the exception of the cross-linking agent) can be added directly to the monomer mixture prior to pre-polymerization.

The resulting composition is coated onto a substrate (which may be transparent to UV radiation) and polymerized in an inert (i.e., oxygen free) atmosphere, e.g., a nitrogen atmosphere by exposure to UV radiation. Examples of suitable substrates include release liners (e.g., silicone release liners) and tape backings (which may be primed or unprimed paper or plastic). A sufficiently inert atmosphere can also be achieved by covering a layer of the polymerizable coating with a plastic film which is substantially transparent to UV radiation and irradiating through that film in air as described in the aforementioned patent using UV lamps. Alternatively, instead of covering the polymerizable coating, an oxidizable tin compound may be added to the polymerizable syrup to increase the tolerance of the syrup to oxygen as described in U.S. Pat. No. 4,303,485 (Levens). The ultraviolet light source preferably has about 90% of the emissions from about 280 to about 400 nm (more preferably from about 300 to about 400 nm), with a maximum at about 351 nm.

A free radical initiator is preferably added to aid in the copolymerization of the low $T_g$ (meth)acrylate monomer(s), high $T_g$ monomer(s) and polar monomer(s). The type of initiator used depends on the polymerization process. Photoinitiators which are useful for polymerizing the polymerizable mixture monomers include benzoin ethers such as benzoin methyl ether or benzoin isopropyl ether, substituted benzoin ethers such as 2-methyl-2-hydroxylpropiophenone, aromatic sulfonyl chlorides such as 2-naphthalenesulfonyl chloride, and photoactive oxides such as 1-phenyl-1,1-propanedione-2-(o-ethoxycarbonyl)oxime. An example of a commercially available photoinitiator is IRGACURE™ 651 (2,2-dimethoxy-1,2-diphenylethane-1-one, from BASF Corp.). Generally, the photoinitiator is present in an amount of about 0.005 to 1 weight percent based on the weight of the copolymerizable monomers. Examples of suitable thermal initiators include AIBN (2,2'-azobis(isobutyronitrile), hydroperoxides, such as tert-butyl hydroperoxide, and peroxides, such as benzoyl peroxide and cyclohexane peroxide.

Preferably, the (meth)acrylic ester (co)polymers are polymerized without solvent. Yet, suitable inert organic solvent, if desired, may be any organic liquid that is sufficiently inert to the reactants and product such that it will not otherwise adversely affect the reaction. Such solvents include ethyl acetate, acetone, methyl ethyl ketones, and mixtures thereof. If used, the amount of solvent is generally about 30 to about 80% by weight based on the total weight of the reactants (monomer and initiator) and solvent. In such cases, the solvent is generally removed from the polymers prior to coating.

Optionally, the composition also includes a chain transfer agent to control the molecular weight of the (meth)acrylic ester (co)polymer. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, pentaerythritol mercaptopropionate, 2-mercaptoimidazole and 2-mercaptoethyl ether.

The amount of chain transfer agent that is useful depends upon the desired molecular weight and the type of chain transfer agent. The chain transfer agent is typically used in amounts from about 0.001 parts to about 10 parts by weight per 100 parts of the base copolymer, and preferably from about 0.01 parts to about 0.5 parts, and most preferably from about 0.02 parts to about 0.20 parts.

Commercially available meth(acrylic) ester (co)polymer PSAs have low Mw (less than about 200,000 g/mole) and low melt viscosity (less than about 40 Pa-s at a temperature of about 130° C. and about 100 sec$^{-1}$ shear rate in a cone and plate rheological measurement) to be considered hot melt coatable by roll coating or slot die methods at temperatures less than about 160° C. and high production coating speeds. Temperatures greater than about 160° C. promote thermal degradation of the PSA. Examples of such commercially available (meth)acrylic ester PSAs include the acRESIN™ series (A204UV, A250UV, A260UV, and DS3532 from BASF Corp.) and the NOVARAD™ RC series (from Novamelt Gmbh). These acrylic ester copolymers require UV curing after coating to develop useful PSA performance due to their low molecular weights. The UV cross-linking is brought about via high intensity UV exposure combined with UV responsive chemical cross-linker grafted in the copolymer structure.

The contact coating process of the invention allows for the ability to coat much higher molecular weight (up to about 1,000,000 g/mole or more) (meth)acrylic ester (co) polymers at low coating weights (down to about 4 g/m$^2$) and high speeds (>about 1000 feet/minute). The ability to coat higher molecular weight acrylics opens up the formulation window to include coatings having higher adhesive performance at lower UV or electron beam doses and may eliminate the need of a post radiation cure for some product applications. Higher molecular weight strongly influences PSA performance in many applications requiring clean removal and shear resistance (e.g., packaging tapes for corrugated fiberboard bonding).

Tackifiers and plasticizers for hot melt coatable (meth) acrylic ester copolymers. The (meth)acrylic ester (co)polymers may be self-tacky or tackified. Useful (meth)acrylic ester (co)polymer PSAs generally contain 0 parts to about 100 parts of one or more compatible tackifying resins to 100 parts of the (meth)acrylic ester (co)polymer. Suitable tackifying resins used with (meth)acrylic ester (co)polymers generally include but are not limited to aliphatic olefin-derived resins such as the ESCOREZ™ 1000 series (from ExxonMobil Chemical Co.); gum rosin esters such as the FORAL™ series and the STAYBELITE-E™ series (both from Pinova, Inc.); tall oil rosin esters such as the SYLVATAC™ and SYLVALITE™ series (from Arizona Chemical), the WESTREZ™ 5000 series (from MeadWestvaco Corp.) and the PERMALYN™ series (from Eastman Chemical Co.); polyterpenes such as the PICCOLYTE™ A, F, C and S series (from Pinova, Inc.); cycloaliphatic hydrocarbons, such as the ESCOREZ™ 5000 series (from ExxonMobil Chemical Co.) and terpene phenolic resins derived from petroleum or turpentine sources such as SYLVARES™ TP 2019 (from Arizona Chemical).

Plasticizing agents selected for use in the (meth)acrylic ester (co)polymers of the present invention possess a range of properties. Generally, the plasticizing agents can be liquid or solid, have a range of molecular weights and architectures, are compatible with the (meth)acrylic ester (co)polymers, are monomeric or polymeric and are non-volatile and non-reactive. Additionally, mixtures of solid and liquid, monomeric and polymeric and other combinations of plasticizing agents can be used in the present invention.

Generally, liquid plasticizing agents are readily compoundable with the (meth)acrylic ester (co)polymers and/or can be chosen to be miscible with the monomers for plasticized PSA compositions prepared using bulk polymerization methods. In addition, liquid plasticizing agents may be delivered directly to non-tacky (meth)acrylic ester (co) polymers or onto already coated base copolymer films and are typically absorbed quickly to activate the pressure-sensitive adhesive properties.

Additionally, the plasticizing agents can have a range of molecular weights and architectures. That is, the plasticizing agents can be either polymeric or monomeric in nature. Typically, monomeric plasticizing agents are derived from low molecular weight acids or alcohols, which are then esterified with respectively a mono-functional alcohol or mono-functional acid. Examples of these are esters of mono- and multibasic acids, such as isopropyl myristate, dibutyl phthalate, diisoctyl phthalate, dibutyl adipate, dibutylsebacate and the like. Useful polymeric plasticizing agents are non-acrylic and are typically derived from cationically or free-radically polymerizable, condensation polymerizable or ring-opening polymerizable monomers to make low molecular weight polymers. Examples of these polymeric plasticizing agents include materials such as polyurethanes, polyureas, polyvinylethers, polyethers, polyesters and the like. As used in this application "non-acrylic" means the polymeric plasticizing agent contains less than about 20% by weight of any (meth)acrylic monomers.

Useful plasticizing agents are compatible with the (meth) acrylic ester (co)polymer, such that once the plasticizing agent is mixed with the (co)polymer, the plasticizing agent does not phase separate from the (co)polymer. By "phase separation" or "phase separate", it is meant that by differential scanning calorimetry (DSC) no detectable thermal transition, such as a melting or glass transition temperature can be found for the pure plasticizing agent in the plasticized (meth)acrylic ester (co)polymer. Some migration of the plasticizing agent from or throughout the plasticized (meth) acrylic ester (co)polymer can be tolerated, such as minor separation due to composition equilibrium or temperature influences, but the plasticizing agent does not migrate to the extent of phase separation between the (meth)acrylic ester (co)polymer and the plasticizing agent. When polymeric plasticizing agents are used, they tend to be a bit more limited in their applications than monomeric plasticizing agents and, in general, the lower the molecular weight of the polymeric plasticizing agent, the higher their compatibility with the (meth)acrylic ester (co)polymer. Plasticizing agent compatibility with the (meth)acrylic ester (co)polymer can also be dependent upon the chemical nature of the plasticizing agent and the monomeric content of the (meth)acrylic ester (co)polymer. For example, polymeric plasticizing agents based on polyether backbones (such as polyethylene glycols) are observed to be more compatible than polyester plasticizing agents, especially when higher levels of acidic polar monomer are used.

Plasticizing agents used in the present invention are also non-volatile. If the plasticizing agent is to be used in bulk polymerization processes where the (meth)acrylic ester (co)polymer is formed in the presence of the plasticizing agent, then the plasticizing agent not only solvates the monomers, but also remains present and stable under polymerization reaction conditions to serve as a polymerization medium for the low $T_g$ (meth)acrylate monomer(s), high $T_g$ monomer(s) and polar monomer(s). The presence of the plasticizing agent in plasticized (meth)acrylic ester (co)polymers having PSA properties operates to maintain adhesion properties of the PSA compositions.

Additionally, useful plasticizing agents are non-reactive, thus preventing copolymerization with the monomers of the (meth)acrylic ester (co)polymer. Thus, plasticizing agents having acrylate functionality, methacrylate functionality, styrene functionality, or other ethylenically unsaturated, free radically reactive functional groups are generally not used.

Particularly useful plasticizing agents include polyalkylene oxides having weight average molecular weights of about 150 to about 5,000, preferably of about 150 to about 1,500, such as polyethylene oxides, polypropylene oxides, polyethylene glycols; alkyl or aryl functionalized polyalkylene oxides, such as PYCAL™ 94 (a phenyl ether of polyethylene oxide from Croda International Plc.); benzoyl functionalized polyethers, such as the BENZOFLEX™ series (from Eastman Chemical Co.); monomethyl ethers of polyethylene oxides; monomeric adipates such as dioctyl adipate, diisononyl adipate, dibutoxyethoxyethyl adipate and dibutoxypropoxypropyl adipate; polymeric adipates such as polyester adipates; citrates, such as acetyltri-n-butyl citrate; phthalates such as butyl benzylphthalates; trimellitates; sebacates; polyesters, such as the PARAPLEX™ G series (from HallStar Co.); phosphate esters, such as the SANTICIZER™ series (from Ferro Corp); glutarates such as PLASTHALL™ 7050 (a dialkyl diether glutarate from the HallStar Co.) and mixtures thereof.

The plasticizing agent is typically used in amounts of from about 1 to about 100 parts by weight per 100 parts (pph) of the (meth)acrylic ester (co)polymer. Preferably, the plasticizing agent is present in amounts from about 3 to about 50 pph. Most preferably, the plasticizing agent is present in amounts from about 3 to about 40 pph.

The amount of plasticizing agent used depends upon the type and ratios of the low $T_g$ (meth)acrylate monomer(s), high $T_g$ monomer(s) and polar monomer(s) employed in the (meth)acrylic ester (co)polymer and the chemical class and molecular weight of the plasticizing agent used in the composition. For example, as the modulus of the (meth)acrylic ester (co)polymer increases, higher levels of plasticizing agent are necessary to bring the compounded material modulus down into the useful range for PSA making (i.e., the shear storage modulus is below the Dahlquist Criterion). As the amount of plasticizing agent in the PSA is increased, maintaining cohesive strength becomes increasingly difficult, thus creating a practical upper limit on the amount of plasticizing agent that can be tolerated in the final PSA. High levels of plasticizing agent may be beneficial if properties such as aggressive tack, low temperature performance or smooth peel are required. Typically, as the molecular weight of the (meth)acrylic ester (co)polymer drops, the maximum plasticizing agent loading that can be used and still obtain good cohesive strength also drops. Very similarly, if high-temperature shear holding is desired, lower plasticizing agent levels are recommended.

Considering practical constraints for PSA formulation, it should be clear that there is also an upper limit for the shear modulus of the (meth)acrylic ester (co)polymer to begin with and still enables PSA behavior with plasticizing agent loadings of about 100 pph or less. Actual modulus values are difficult to define as it strongly depends on the type of plasticizing agent, plasticizing efficiency and the compatibility of the plasticizing agent with the (meth)acrylic ester (co)polymer.

Cross-linking Agents. The (meth)acrylic ester (co)polymers of the present invention can also include a cross-linking agent to improve the internal strength, solvent resistance and other properties. The cross-linking agent is present in an amount of from about 0.05 to about 5 percent by weight based on 100 parts of the (meth)acrylic ester (co)polymer or based upon 100 parts by weight of the low $T_g$ (meth)acrylate monomer(s), high $T_g$ monomer(s) and polar monomer(s) employed.

Cross-linking agents useful in solution, emulsion, suspension and solventless polymerized hot melt (meth)acrylic ester (co)polymer compositions are those which are free radically copolymerizable and/or which effect cross-linking through exposure to radiation, moisture or heat following coating of the (meth)acrylic ester (co)polymer. Typically, to maintain hot melt processability and coatability of the (meth)acrylic ester (co)polymer, cross-linking occurs following the compounding of the (meth)acrylic ester (co)polymer with the tackifiers, plasticizers, cross-linkers and other additives and coating of the mixture. One type of chemical cross-linker is a photosensitive cross-linker that is activated by exposure to high intensity UV light. Examples of such cross-linkers are described in U.S. Pat. No. 4,737,559 (Kellen et al.) and include hydrogen abstracting benzophenones and mono-ethylenically unsaturated aromatic ketones, particularly 4-acryloxybenzophenone (4ABP). Another class of photosensitve cross-linkers includes the substituted triazines, such as those disclosed in U.S. Pat. No. 4,329,384 (Vesley et al.) and U.S. Pat. No. 4,330,590 (Vesley), e.g., 2,4-bis(trichloromethyl)-6-p-methoxystyrene-S-triazine and the chromophore halomethyl-S-triazines. The substituted triazines are activated by UV light generated from artificial sources such as medium pressure mercury lamps or a UV blacklight. Another class of chemical cross-linkers includes multi-functional acrylates disclosed in U.S. Pat. No. 4,379,201 (Heilmann et al.), such as HDDA, TMPTA, pentaerytlritol tetraacrylate (PETA), 1,2-ethylene glycol diacrylate (EGDA) and 1,12-dodecanediol diacrylate. The multi-functional acrylates are activated by exposure to UV light when combined with UV absorbing photoinitiators such as IRGACURE™ 651 (2,2-dimethoxy-1,2-diphenylethane-1-one, from BASF Corp.) and visible light absorbing photo-initiators such as IRGACURE 819 [bis(2,4,6-trimethylbenzoyl)-phenylphosphineoxide from BASF Corp.]. The multi-functional acrylates can be activated without the presence of a photo-initiator upon exposure to high-energy electromagnetic radiation such as gamma or electron beam radiation. Some of the (meth) acrylic ester (co)polymers will cross-link without the addition of chemical photo cross-linkers upon exposure to gamma or electron beam radiation.

Ionic cross-linking methods can also be used. Examples of these include the simple addition of multifunctional metal ions, such as for example zirconium acetate (from Magnesium Elektron Ltd., Flemington, N.J., USA); or the compounding with polymeric basic cross-linkers as disclosed in U.S. Pat. No. 6,720,387 (Stark et al.).

(b) Thermoplastic Elastomers

In some embodiments, the melt coated layer comprises one or more thermoplastic elastomers having a collective melt viscosity greater than about 20,000 cP, measured at any temperature suitable for hot-melt coating and at shear rates less than 100 sec$^{-1}$ or frequencies less than 100 rad/sec, and the melt coated layer has a coating weight less than about 12 g/m$^2$.

If desired, such melt coated layers can be formed having a coating weight less than about 9 g/m$^2$.

If desired, such melt coated layers can be formed using thermoplastic elastomers having a collective melt viscosity, measured at any temperature suitable for hot-melt coating and at shear rates less than 100 sec$^{-1}$ or frequencies less than 100 rad/sec, greater than about 50,000 cP, greater than about 100,000 cP, or even greater than about 1,000,000 cP.

Illustrative examples of thermoplastic elastomers suitable for use herein include elastomers selected from the group consisting of styrene block copolymers, e.g., styrene-isoprene-styrene triblock copolymers or styrene-ethylene/butylenes-styrene triblock copolymers.

If desired, in embodiments where the melt coated layer comprises one or more thermoplastic elastomers it may further comprises a tackifying resin, e.g., a $C_5$ resin.

Thermoplastic polymers soften and flow upon the application of heat but resolidify upon cooling; thermoplastic polymers can be remelted and molded. Thermoplastic polymers can be amorphous or semicrystalline. Amorphous hot melt coatable thermoplastic polymers have a glass transition temperature ($T_g$) but are not crystalline. Semicrystalline thermoplastic polymers have a glass transition temperature (Tg) and are partially crystalline.

Hot melt coatable thermoplastic polymers can be modified with compatible tackifying and plasticizing agents, process aids, antioxidants, pigments, fillers, chemical foaming agents and physical foaming agents.

Styrene block copolymer thermoplastic elastomeric synthetic elastomers. Another class of polymeric materials that can be coated using the process of the invention is the hot melt coatable styrene block copolymer thermoplastic elastomeric (TPE) synthetic elastomers. Styrene block copolymer (SBC) TPEs are a unique class of synthetic elastomers that also have thermoplastic flow. SBCs generally comprise copolymers of the A-B or A-B-A type, where A represents a thermoplastic polystyrene block and B represents an elastomeric block of polyisoprene, polybutadiene, poly(ethylene/butylene), poly(ethylene/propylene) or poly(isoprene/butadiene). SBC molecular weights typically range from about 100,000 g/mole to about 1,500,000 g/mole. SBCs can exist in various molecular architectures including linear, radial, star and tapered geometries. Variation of the volume fraction of styrene in the two-phase composition leads to polystyrene domains in the shape of spheroids, cylinders, plates and co-continuous structures. Examples of commercially available SBCs useful in formulating pressure-sensitive adhesives (PSAs) include styrene-isoprene block copolymers such as KRATON™ D1161P (from Kraton Performance Polymers, Inc.), VECTOR™ 4113 (from Dexco Polymers LLP), QUINTAC™ 3620 (from Zeon Corp.) and EUROPRENE™ SOL T 9113 (from Polimeri Europa S.p.A.); styrene-ethylene/butylene block copolymers such as KRATON™ G1657 (from Kraton Performance Polymers, Inc.); styrene-ethylene/propylene block copolymers such as KRATON™ G1702 (from Kraton Performance Polymers, Inc.); styrene-butadiene block copolymers such as KRATON™ D1118X (from Kraton Performance Polymers, Inc.) and styrene-isoprene/butadiene block copolymers such as KRATON™ D1171P (from Kraton Performance Polymers, Inc.). High molecular weight (e.g., >800,000 g/mole) SBC's based on multi-arm star-block copolymer architectures such as those described in U.S. Pat. Nos. 5,296,547 and 5,773,506 (both Nestegard et al.) are particularly useful as electron beam radiation curable TPE components in SBC PSAs. Other SBCs contain reactive functionality on the elastomeric block such as maleic anhydride (MA). An example is the KRATON™ FG series of MA modified styrene-ethylene/butylene block copolymers (from Kraton Performance Polymers, Inc.). An SBC based on polystyrene end block(s) and soft acrylic poly(n-butylacrylate) midblock is available under the NANOSTRENGTH SAS (from Arkema Inc.). Different SBCs can be combined to create alloyed blends.

SBCs can be modified by the addition of tackifying resins and plasticizing oils to increase the pressure-sensitive tack. The additives can also facilitate hot melt coating by reducing the elastomer melt viscosity. Tackifying resins that associate with the elastomer phase generally develop tack in the PSA. Examples of commercially available elastomer phase associating resins include but are not limited to aliphatic olefin-derived resins such as the ESCOREZ™ 1000 series (from ExxonMobil Chemical Co.) and the WINGTACK™ series (from Cray Valley USA, LLC); aromatic modified aliphatic resins such as the ESCOREZ™ 2000 series (from ExxonMobil Chemical Co.) and the NORSOLENE™ M series (from Cray Valley USA, LLC); cycloaliphatic hydrocarbons, such as the ESCOREZ™ 5000 series (from ExxonMobil Chemical Co.); hydrogenated pure monomer resins such as the REGALREZ™ series (from Eastman Chemical Co.); gum rosin esters such as the FORAL™ series and the STAYBELITE-E™ series (both from Pinova, Inc.); tall oil rosin esters such as the SYLVATAC™ and SYLVALITE™ series (from Arizona Chemical), the WESTREZ™ 5000 series (from MeadWestvaco Corp.) and the PERMALYN™ series (from Eastman Chemical Co.); polyterpenes such as the PICCOLYTE™ A, F, C and S series (from Pinova, Inc.); and terpene phenolic resins derived from petroleum or turpentine sources such as SYLVARES™ TP 2019 (from Arizona Chemical). Resins that associate with the thermoplastic (polystyrene) phase tend to stiffen the pressure-sensitive adhesive. Thermoplastic phase associating resins include but are not limited to polyaromatics such as the PICCO™ 6100 aromatic hydrocarbon resin (from Eastman Chemical Co.); coumarone-indene resins such as CUMAR™ P-25 (from Neville Chemical Co.) and other high-solubility parameter resins derived from coal tar or petroleum and having softening points above about 85° C. such as SYLVARES™ SA 100 alpha-methyl styrene resin (from Arizona Chemical) and the PICCOTEX™ series of alpha-methyl styrene/vinyl toluene resins (from Eastman Chemical Co.). Useful commercially available plasticizers include but are not limited to rubber phase associating hydrocarbon oils such as the TUFFLO™ HR series of naphthenic oils (from Calumet Specialty Products Partners, LP), NYFLEX™ 222B naphthenic oil (from Nynas AB), KAYDOL™ heavy white mineral oil (from Sonneborn Refined Products B.V.) and liquid polyisobutylene elastomers such as OPPANOL™ B10 (from BASF).

Other materials can be added for special purposes including but not limited to pigments; antioxidants such as IRGANOX™ 1010 and IRGANOX™ 1076 hindered phenols (both from BASF Corp.), IRGANOX™ 1726 bi-functional hindered phenol/thioester (from BASF Corp.) and ARENOX™ DL thioester antioxidant (from Mayzo, Inc.); antiozonants such as NIBUD™, a nickel dibutyl dithiocarbamate (from Akrochem, Inc.) and ultraviolet light inhibitors such as TINUVIN™ P (from BASF Corp.). Ultraviolet (UV) initiators such as IRGANOX™ 1010 and IRGANOX™ 819 (from BASF Corp.) can be combined with multi-functional acrylate monomers such as hexanedioldiacrylate (HDDA), trimethylolpropanetriacrylate (TMPTA), etc to facilitate ultraviolet (UV) and or electron beam (EB) curing of the SBC PSA coating. High molecular weight multi-arm star-block SBCs based on isoprene and butadiene mid-blocks can be cross-linked in the absence of chemical agents (e.g., multi-functional acrylates) upon exposure to electron beam and gamma radiation.

Acrylic block copolymer thermoplastic elastomers. Another class of polymeric materials that can be coated using the process of the invention is hot melt coatable acrylic block copolymer thermoplastic elastomers. Acrylic block copolymer (ABC) thermoplastic elastomers are similar to SBCs except the polystyrene blocks are replaced by glassy thermoplastic poly(methylmethacrylate) PMMA blocks and the elastomer block is replaced by a soft acrylic ester block such as poly(butylacrylate) BA or poly(2-ethylhexylacrylate) 2EHA. The ABCs can be self-tacky or modified with compatible tackifying resins (e.g., gum or tall oil rosin esters) and plasticizers (e.g., phthalate esters or oligomeric BA or 2EHA). ABCs are commercially available under the NANOSTRENGTH™ MAM (from Arkema Inc.) and KURARITY™ (from Kuraray Co., Ltd.). ABCs can be cross-linked in the same manner as the SBCs by employing conventional UV, electron beam and gamma radiation methods.

Hot melt coatable acrylic block copolymer thermoplastic elastomers can be modified with compatible tackifying and plasticizing agents, process aids, antioxidants, pigments, fillers, chemical foaming agents and physical foaming agents.

Thermoplastic elastomers. Another class of polymeric materials that can be coated by the process of the invention is the hot melt coatable thermoplastic elastomers. Commercially available hot melt coatable thermoplastic elastomers include but are not limited to thermoplastic polyurethanes (TPUs) such as the ESTANE™ and PELLETHANE™ series of polyether and polyester aromatic based TPUs (from Lubrizol Corp); thermoplastic co-polyesters such as the HYTREL™ series (from Dupont Co.); polyether-block-amides such as the polyamide 12 (PA12) and polytetramethylene glycol (PTMG) based PEBAX™ series (from Arkema Inc.); metallocene catalyzed thermoplastic polyolefin (TPO) block copolymer elastomers such as the AFFINITY™, AMPLIFY™, ENGAGE™, EXACT™, and INFUSE™ series (from Dow Chemical Co.) and the EXACT™, EXXELON™, and VISTAMAXX™ series (from ExxonMobil Chemical Co.); and blends thereof.

Hot melt coatable thermoplastic elastomers can be modified with compatible tackifying and plasticizing agents, process aids, antioxidants, pigments, fillers, chemical foaming agents and physical foaming agents.

(c) Natural Rubbers and Synthetic Rubbers

Another class of polymeric materials that can be coated by the process of the invention is the hot melt coatable non-thermoplastic elastomers. "Non-thermoplastic hydrocarbon elastomers" are hydrocarbon homopolymers or hydrocarbon copolymers. They are referred to generally herein as "elastomers." By definition, non-thermoplastic hydrocarbon elastomers are those hydrocarbon elastomers having no measurable melting temperature as measured using Differential Scanning calorimetry (DSC). Non-thermoplastic hydrocarbon elastomers are distinguished from block copolymers such as SBCs and acrylic block copolymers (ABCs) based on PMMA-BA. Useful non-TPEs of the invention include natural rubber (NR) and synthetic rubber (SR) elastomers.

In some embodiments, the molten coating composition comprises, and if desired may consist essentially of, one or more natural rubbers or synthetic rubbers having a collective molecular weight of at least about 200,000 g/mol which are not a thermoplastic elastomer and which have a melt viscosity, measured at any temperature suitable for hot-melt coating and at shear rates less than 100 sec$^{-1}$ or frequencies less than 100 rad/sec, that is greater than about 50,000 cP, greater than about 100,000 cP, in some cases, and even greater than about 1,000,000 cP, if desired.

In typical embodiments of the invention made with such compositions the melt coated layer has a coating weight less than about 29 g/m$^2$. In accordance with the invention, the melt coating layer can be made at coating weight, for instance, less than about 25 g/m$^2$ in some cases, less than about 19 g/m$^2$ in some cases, less than about 15 g/m$^2$, in some cases, and even less than about less than about 11 g/m$^2$ if desired.

Typically, such melt coated layers contain no more than about 1% by weight of gelled natural or synthetic rubber.

Melt coated layers of articles of the invention comprising one or more natural rubbers or synthetic rubbers as described herein may further comprises at least one additive selected from the group consisting of tackifiers and plasticizers. For example, the melt coated layer may comprise 10 to 200 parts by weight tackifier per 100 parts by weight natural rubber.

Illustrative examples of natural and synthetic rubbers that may be used herein include one or more rubbers s elected from the group consisting of isoprene, butadiene, nitrile rubber, and styrene-butadiene rubber.

Natural rubber is predominantly cis-1,4-polyisoprene (cis-PI) and ranges in grade from a light pale crepe grade to a darker ribbed smoked sheet. Examples include SVR CV-60 (a controlled viscosity rubber grade) and SMR-5 (a ribbed smoked sheet rubber grade). NR molecular weights range from about 100,000 g/mol to about 1,000,000 g/mol. Most NR grades need to be masticated to reduce their molecular weight to facilitate hot melt coating. U.S. Pat. No. 5,539,033 (Bredahl et al.) describes a twin-screw extrusion compounding operation for providing hot melt NR coatings.

Another class of non-thermoplastic elastomers includes synthetic rubbers that are either self-tacky or non-tacky and require the addition of tackifiers and/or plasticizers to generate PSA tack. Synthetic rubbers have high molecular weights (e.g., molecular weights>about 300,000 grams/mole) but are generally easier to process than NR. Such elastomers include, but are not limited to, butyl rubber (a copolymer of isobutylene with less than 3 percent isoprene-BR); acrylonitrile butadiene rubber (NBR) and hydrogenated acrylonitrile butyl rubber (HNBR); polyisobutylene (PIB); polychloroprene (CR); ethylene-propylene-diene monomer rubber (EPDM); cis-polyisoprene (cis-PI); polybutadiene (PB); poly(styrene-co-butadiene) random copolymers (SBR); poly(alpha-olefins); fluoroelastomers; thermoplastic vulcanizates (TPV); ethylene vinyl acetate rubbers (EVM) having high (greater than 40 wt. % vinyl acetate content) and blends thereof.

Commercially available non-thermoplastic synthetic rubbers include high molecular weight [viscosity average molecular weight (Mv) about 500,000 g/mole] synthetic cis-PI elastomers such as the CARIFLEX™ IR series of (from Kraton Performance Polymers, Inc.) and the NAT-SYN™ series (from Goodyear Chemical); the OPPANOL™ series of high molecular weight PIB rubbers (from BASF Corp.) including, for example, B30 (Mv about 200,000 g/mole) and B80 (Mv about 800,000 g/mole); EPDM hydrocarbon elastomers such as the NORDEL™ IP series of EPDM hydrocarbon elastomers (from Dow Chemical Co.) and the VISTALON™ series (from ExxonMobil Chemical Co.); PB elastomers such as the BUDENE™ series (from Goodyear Chemical) and the DIENE™ series (from Firestone Polymers); SBR elastomers such as the SOLFLEX™ and PLIOFLEX™ series (from Goodyear Chemical) and the STEREON™ and DURADENE™ series (from Firestone Polymers); CR elastomers such as the NEOPRENE™ series (from Dupont Elastomers); TPV's such as the ETPV series (from Dupont Elastomers) and the SANTOPRENE series (from ExxonMobil Chemical Corp.); fluoroelastomers such as the VITON series (from Dupont Elastomers) and the DYNEON™ series (from 3M Company); NBR elastomers such as the KRYNAC™, PERBUNAN™ and BAYMOD™ N series (from Lanxess Emulsion Rubber, France); HNBR elastomers such as the THERBAN™ series (from Lanxess Emulsion Rubber, France) and EVM elastomers such as the LEVAPREN™, BAYMOD™ L, and LEVAMELT™ series (from Lanxess Emulsion Rubber, France).

NR and synthetic non-TPEs can be modified by the addition of tackifying resins and plasticizing oils to increase the pressure-sensitive tack. The additives can also facilitate hot melt coating by reducing the elastomer melt viscosity. Useful NR PSAs generally contain masticated natural rubber, about 25 parts to about 300 parts of one or more tackifying resins to 100 parts of natural rubber and about 0.5 to about 2.0 parts of one or more antioxidants. Suitable tackifying resins used with NR and cis-PI generally include but are not limited to aliphatic olefin-derived resins such as the PICCOTAC™ 1000 series (from Eastman Chemical Co.) and ESCOREZ™ 1000 series (from ExxonMobil Chemical Co.); gum rosin esters such as the FORAL™ series and the STAYBELITE-E™ series (both from Pinova, Inc.); tall oil rosin esters such as the SYLVATAC™ and SYLVALITE™ series (from Arizona Chemical), the WESTRES™ 5000 series (from MeadWestvaco Corp.) and the PERMALYN™ series (from Eastman Chemical Co.); polyterpenes such as the PICCOLYTE™ A, F, C and S series (from Pinova, Inc.); cycloaliphatic hydrocarbons, such as the ESCOREZ™ 5000 series (from ExxonMobil Chemical Co.) and terpene phenolic resins derived from petroleum or turpentine sources such as SYLVARES™ TP 2019 (from Arizona Chemical). Plasticizing aids can be added to soften the NR and cis-PI elastomers and further promote hot melt coating by reducing melt viscosity. Useful commercially available plasticizers include but are not limited to hydrocarbon oils such as the TUFFLO™ HR series of naphthenic oils (from Calumet Specialty Products Partners, LP), NYFLEX™ 222B naphthenic process oil (from Nynas AB), KAYDOL™ heavy white mineral oil (from Sonneborn Refined Products B.V.) and liquid polyisobutene elastomers such as OPPANOL™ B10 (from BASF). Butadiene containing elastomers such as PB and SBR are generally compatible with tackifying resins such as gum rosin esters, tall oil rosin esters, alpha-pinene (e.g., PICCOLYTE™ A series from Pinova), aromatic modified aliphatic resins (e.g., ESCOREZ™ 2000 series) and cycloaliphatic hydrocarbons (e.g., ESCOREZ™ 5000 series). PIB and BR are generally compatible with aliphatic olefin-derived resins (e.g., ESCOREZ™ 1000 series) and hydrogenated pure monomer resins (e.g., REGALREZ™). PIB and BR are also generally compatible with and aliphatic oils, naphthenic oils and (from Calumet Specialty Products Partners, LP), NYFLEX™ 222B naphthenic oil and liquid polyisobutylene elastomers such as OPPANOL™ B10 (from BASF).

Antioxidants are used to retard the oxidative attack on NR and other non-thermoplastic synthetic elastomers that can result in loss of the cohesive strength of the elastomer. Useful antioxidants include but are not limited to amines, such as N-N' di-β-naphthyl-1,4-phenylenediamine, available as AgeRite D; IRGANOX™ 1010 and IRGANOX™ 1076 hindered phenols (both from BASF Corp.), IRGANOX™ 1726 bi-functional hindered phenol/thioester antioxidant (from BASF Corp.) and ARENOX™ DL thioester antioxidant (from Mayzo, Inc.); antiozonants such as NIBUD™, a nickel dibutyl dithiocarbamate (from Akrochem, Inc.); phenolics such as 2,5-di-(t-amyl) hydroquinone, available as SANTOVAR™, from Monsanto Chemical Co., 2-2'-methylenebis(4-methyl-6-tert butyl phenol) available as Antioxidant 2246; and dithiocarbamates, such as zinc dithiodibutyl carbamate.

NR and synthetic non-TPE elastomers and their corresponding PSAs can be cross-linked by exposure to high-energy electromagnetic radiation such as electron beam and gamma. Other materials can be added to NR and synthetic elastomers and PSAs for special purposes including pigments, fillers, chemical foaming agents, physical foaming agents, electron beam curing synergists such as multifunctional acrylate monomers including but not limited to HDDA, TMPTA, etc., can be added to facilitate ultraviolet (UV) and/or electron beam (EB) curing of the NR PSA coating, and thermal curing agents to partially vulcanize the NR, synthetic elastomers and their corresponding PSAs.

(d) Nonelastomeric Thermoplastic Polymers

In still other embodiments, articles of the invention may be made with melt coated layers formed from compositions comprising, or even consisting essentially of, one or more nonelastomeric thermoplastic polymers having a collective molecular weight of from about 50,000 to about 3,000,000 g/mol and which is free of solvents. Such melt coated layers may have a coating weight less than about 17 g/m² typically, less than about 13 g/m² in some cases, and even less than about 9 g/m² if desired.

Illustrative examples of suitable nonelastomeric thermoplastic polymers for use herein include those selected from the group consisting of polyolefins and aliphatic polyesters. In some embodiments, the melt coated layer comprises one or more semicrystalline nonelastomeric thermoplastic polymers.

Illustrative examples of thermoplastic polymers that can be used as melt compositions herein are discussed below.

Examples include but are not limited to acrylics such as polymethylmethacrylate (PMMA), polycarbonate (PC), atactic polystyrene (a-PS), acrylonitrile butadiene styrene copolymer (ABS), styrene acrylonitrile copolymers (SAN) and blends thereof. The majority of hot melt coatable thermoplastics have a $T_g$ and a higher temperature crystalline melting point ($T_m$). Examples include but are not limited to polyolefins such as polybutylene, low-density polyethylene (LDPE), linear low-density polyethylene (LLDPE), medium density polyethylene (MPE), high-density polyethylene (HDPE), isotactic polypropylene (i-PP), ethylene/propylene copolymers, ethylene/butylene copolymers and poly(ethylene-co-vinyl acetate) or EVA; syndiotactic polystyrene (s-PS); polyesters such as polybutylene terephthalate (PBT), polyethylene terephthalate (PET), polyethylene naphthalate (PEN), polylactic acid (PLA), polycaprolactone (PCL), polyethylene adipate (PEA) and polyhydroxyalkanoate (PHA); polyvinyl chloride (PVC); polyvinylidine chloride (PVDC); polyamides; ionomers and fluoroplastics such as polytetrafluoroethylene (PTFE), fluorinated ethylene propylene (FEP), polyvinylidine fluoride (PVDF) and copolymers of tetrafluoroethylene, hexafluoropropylene and vinylidene fluoride known as THV; and blends thereof.

Substrate

The invention can be carried out with a variety of substrate materials, typically selected in large part based upon desired properties of the resultant article. The substrate should be capable of being manipulated through the coating process. Typically the substrate is flexible. An advantage of the present invention is that the substrate need not exhibit such robust tear or tensile strength as is required for some other coating operations because lower nip pressure and minimal deformation or penetration of the backup roll may be used. The substrate may be single or multilayer and may optionally be treated or primed such that its first major surface is compatible with the hot melt coating to be applied thereto in accordance with the invention. Illustrative examples of materials used as substrate herein include polymeric films (e.g., biaxially oriented polypropylene and polyester), fabrics (e.g., weaves, knits, and non-woven webs), metal films (e.g., aluminum foils), papers (e.g., flat, rubbed, or creped papers), and combinations thereof. The substrate may be substantially continuous or not as desired. The substrate may have regular or irregular openings therein.

Because the present invention employs melt coating, in many embodiments the coating composition will be substantially free of liquid medium. Accordingly, suitable substrates can be selected without regard to compatibility with liquid mediums or the post-coating treatments used to remove them.

In some instances, the substrate or web may be primed before coating to improve adhesion of the melt coated layer thereto.

After melt coating in accordance with the invention, the resultant article may be the subject of further processing. For instance, the article may be wound onto itself into roll form. An advantage of the present invention is that no drying is necessary between the coating step and the step of winding into roll form. In some instances, the article may be cut into sheet form.

In some embodiments, the melt coated layer may be cross linked after coating, e.g., by exposure to UV, ebeam, or other effective actinic radiation.

In instances where the melt coated layer is an adhesive, in use the article may be adhered to an adherend by contacting the melt coated layer to the adherend and activating the adhesive, e.g., applying suitable pressure in instances where the melt coated layer is a PSA or applying suitable means such as chemical agents, initiators, or heat in instances where the melt coating is activated thereby.

EXAMPLES

The invention is further explained with reference to the following nonlimiting examples.

Useful Conversions

RMS=1.11*Ra

1 µm=40 µin 1 oz/in=0.11 N/cm 1 feet/minute=0.305 m/minute 1 grain/24 in$^2$=4.2 grams/meter$^2$ (gsm)

0.5" diameter rod at 24 rpm=0.96 meters/minute linear speed

Materials

The following materials were used in the Examples as indicated below.

| | |
|---|---|
| ARENOX™ DL | Thioester antioxidant from Mayzo, Inc. (Suwanee, GA) |
| ESCOREZ™ 1310 | Hydrocarbon tackifying resin from ExxonMobil Chemical Co. (Houston, TX) |
| IRGACURE™ 651 | Benzil dimethyl ketal photo initiator from BASF (Ludwigshafen, GE) |
| IRGANOX™ 1010 | Hindered phenol antioxidant from BASF |
| IRGANOX™ 1076 | Hindered phenol antioxidant from BASF |
| KRATON™ D1161 | Styrene-isoprene thermoplastic elastomeric copolymer from Kraton Performance Polymers, Inc. (Houston, TX) |
| NYFLEX™ 222B | Naphthenic process oil from Nynas AB (Stockholm, SE) |
| PICCOLYTE™ S115 | Polyterpene tackifying resin from Pinova, Inc. (Brunswick, GA) |
| PRIMACOR™ 3330 | Ethylene-acrylic acid thermoplastic polyolefin copolymer with 6 wt. % acrylic acid, 0.933 g/cc density, 5.5 g/10 minutes melt index, and a 100° C. melting temperature, from Dow Chemical Company (Midland, MI) |
| QUINTAC™ 3620 | Styrene-isoprene copolymer thermoplastic elastomer from Zeon Corporation (Tokyo, JP) |
| SMR CV60 | Controlled viscosity grade natural rubber (NR) non-thermoplastic elastomer from Goodyear Chemical Plantation Division |
| WINGTACK™ EXTRA | Hydrocarbon tackifying resin from Cray Valley USA, LLC (Exton, PA) |
| WINGTACK™ PLUS | Hydrocarbon tackifying resin from Cray Valley USA, LLC |

Test Methods

The following test methods were used in the Examples as indicated below.

Coating Weight. Coating weights were determined by weighing a 24 in$^2$ (3.7 cm$^2$) sample of PSA-coated film substrate and subtracting the weight of a 24 in$^2$ sample of the uncoated substrate to yield the weight of PSA coating.

Coating Density. Coating density was determined by determining the coating weight and dividing by the average coating thickness (caliper) of the resultant melt coating.

Melt Viscosity. Melt viscosity was measured using oscillatory dynamic mechanical analysis (DMA) using 25 mm parallel plates at the coating temperature and 100 sec$^{-1}$ shear rate for the hot melt coatings of the invention. Oscillating shear viscosity data was obtained at 1 sec$^{-1}$ to approximately 100 sec$^{-1}$ shear rates. The data was fit with a power law trend line so that the power law exponent could be extracted. Table 1 contains the oscillatory shear melt viscosity data for the polymers exemplified in the Examples.

TABLE 1

DMA oscillatory shear melt viscosity and polymer Mw data

| Examples | Coating Melt Temp. (° C.) | Coating Melt Viscosity at 100 sec$^{-1}$ (Pa-s) | Power law exponent | Polymer Type | Polymer Mw (g/mol) |
|---|---|---|---|---|---|
| 1 to 5 | 177 | 48 | 0.12 | SIS | 1.7 × 10$^5$ |
| 6 to 9, C1 | 149 | 80 | 0.66 | Acrylic acid ester | 7.4 × 10$^5$ |
| 10 to 12 | 149 | 115 | 0.76 | Natural rubber | 9.9 × 10$^5$ |
| 13 to 20 | 149 | 100 | 0.78 | NR | 1.1 × 10$^6$ |
| 28 to 29, C2 | 260 | 167 | 0.29 | Polyolefin | nm* |
| 30, C2 | 149 | 139 | 0.90 | SIS | 1.6 × 10$^5$ |
| 31 to 32, C4 to C5 | 204 | 63 | 0.24 | SIS | 1.7 × 10$^5$ |
| 33 to 34, C6 to C7 | 177 | 52 | 0.61 | Acrylic acid ester | 8.1 × 10$^5$ |

TABLE 1-continued

DMA oscillatory shear melt viscosity and polymer Mw data

| Examples | Coating Melt Temp. (° C.) | Coating Melt Viscosity at 100 sec$^{-1}$ (Pa-s) | Power law exponent | Polymer Type | Polymer Mw (g/mol) |
|---|---|---|---|---|---|
| 35 to 37 | 177 | 55 | 0.24 | Acrylic acid ester | 5.3 × 10$^5$ |

*not measured

Peel Adhesion-to-Steel Test. Pressure-sensitive adhesive tape samples 2.54 cm (1 inch) wide and 15 cm (6 inches) long were tested for peel adhesion to steel. The samples were adhered to a clean stainless steel surface by rolling the tapes with a 2.1 kg (4.5 lb.) hand roller using 4 passes. After aging at controlled temperature and humidity conditions (approximately 22° C., 40% relative humidity) for at least 15 minutes, the force to remove the tapes was measured using a Model 3M90 slip/peel tester (from Instrumentors, Inc.) in 180° geometry at 30.5 cm/min (12 in/min) peel rate, unless otherwise noted.

Rolling Ball Tack. A 7/16 inch (1.1 cm) diameter stainless steel ball is rolled down a 167 mm long track at a 21° 30' angle onto a PSA coated tape sample that is 2 inches (5.1 cm) wide by 12 inches (30.5 cm) long. The distance the ball travels on the PSA surface is recorded. The shorter the distance the ball travels, the higher the tack.

Shear-To-Steel Test #1. Shear strength, manifested as holding time, was measured on pressure-sensitive adhesive tape samples at controlled temperature and humidity conditions (approximately 22° C., 40% relative humidity). A 12.7 mm (0.5 inch) wide by 25.4 mm (1 inch) long section of the PSA-coated tape was adhered to a clean stainless steel sheet with a 2.1 kg (4.5 lb.) roller using 4 passes. A 1000 g weight was hung from the sample. The amount of time for the weight to drop was recorded. A "+" after the shear time denotes that the test was stopped at that time with no shear failure.

Shear-To-Steel Test #2. Same as Shear-To-Steel Test #1 except a 25.4 mm (1 inch) wide by 25.4 mm (1 inch) long section of the tape was used.

Shear-To-Steel Test #3. Same as Shear-To-Steel Test #1 except a 12.7 mm (0.5 inch) wide by 12.7 mm (0.5 inch) long section of the tape was used.

Shear-To-Corrugated Fiberboard (FB) Surface. Same as Shear-To-Steel Test #3 except sample was bonded to a corrugated fiberboard surface instead of steel.

Weight Average Molecular Weight (Mw) Determination. Mw was measured for the hot melt coatable polymers used in the Examples. 10 milliliters (mL) of tetrahydrofuran (THF) was added to approximately 25 milligrams (mg) of each coated example to give a solution of approximately 0.25% weight/volume concentration. The solution was shaken overnight and filtered using 0.2 micron (μm) polytetrafluoroethylene (PTFE) syringe filters. Gel permeation chromatography (GPC) analysis was performed on the polymer solutions using an Agilent high pressure liquid chromatography (HPLC) molecular weight distribution (MWD) analyzer. The column set was a JORDI-GEL™ DVB Mixed Bed LS (250×10 mm) with column heater at 40° C. The eluent was stabilized THF flowing at 1.0 mL/minute. The polymer solution was injected at 30 μL and the detector measured the change in refractive index. The Mw was measured for the polymer component for the Examples and is tabulated in Table 1.

% Gloss. The diffuse reflection or % gloss of the surface of the coating was measured at 60° using a micro-TRI gloss meter (from BYK Instruments, a division of ALTANA). The tabulated value is the average of 5 measurements per Example. In the paint industry, a flat (matte) glass ranges from 1 to 9% gloss.

Examples 1 to 5

Examples 1 to 5 demonstrate a modified rotary-rod slot die contact coating process to coat a hot melt tackified styrene-isoprene (SI) thermoplastic elastomeric block copolymer pressure-sensitive adhesive (PSA) at ultra-low coating weights.

The SI PSA was pre-compounded using a twin-screw extruder (TSE) process as described in Example C17 of U.S. Pat. No. 6,632,522 (Hyde et al.). The SI PSA consisted of 40.7 wt. % KRATON™ D1161 SI copolymer, 46.7 wt. % WINGTACK™ PLUS hydrocarbon tackifying resin, 11.4 wt. % NYFLEX™ 222B naphthenic plasticizing oil, 0.6 wt. % IRGANOX™ 1010 hindered phenol antioxidant and 0.6 wt. % ARENOX™ DL thioester antioxidant. The pre-compounded SI PSA was re-melted and pumped using a 2 inch (5.1 cm) diameter BONNOT™ single-stage extruder (The Bonnot Company, Uniontown, Ohio) fitted with a 3.0 cubic centimeters/revolution (cc/rev) ZENITH™ gear pump (Zenith Pumps, Monroe, N.C.) into Barrel #2 of a HAAKE™ Micro-18 18 mm fully intermeshing and counter-rotating TSE having a length-to-diameter ratio (L/D) of 30:1 and 8 barrel sections containing transport and kneading sections. The TSE screw speed was 200 rpm. The TSE was discharged using a 3.0 cc/rev ZENITH gear pump through a flexible hose into a rotary rod slot die. The die had a 5.25 inch (13.3 cm) wide and 0.005 inch (127 micrometers) thick slot. The hot melt exited the die slot and contacted a rotating rod.

The rod stock was a case-hardened stainless steel Thomson 60 CASE LINEARRACE™ shaft (Thomson Industries, Inc., Radford, Va.) with a 0.5 inch (1.3 cm) diameter. The rod had a 24 microinch (μin) or 0.6 μm peak-to-peak average surface roughness (Ra). The average peak-to-valley surface roughness parameter (Rz) was 169 μin (4.2 μm).

The rotary rod slot die and flowing hot melt PSA contacted a moving 0.0016 inch (41 μm) thick and 6.0 inches (15.2 cm) wide biaxially oriented polyethylene terephthalate (BOPET) film which contacted a rubber covered backup roll. The rod die with rod rotating at 10 rpm in the forward direction (in the same direction as the moving BOPET film) was slowly indexed toward the moving web until the hot melt PSA coated across the full 5.25 inches (13.3 cm). The final penetration depth of the rod into the BOPET film/backup roll was designated "LOW" and ranged from 0.005 inch (127 μm) to 0.010 inch (254 μm). The rod speed was adjusted to provide a continuous coating of the hot melt onto the BOPET film. Lower rod speeds resulted in both coated and uncoated regions (coating voids) on the BOPET film.

Table 2 summarizes the process parameters and Table 3 summarizes the adhesive tape properties for Examples 1 to 5.

TABLE 2

Coating process parameters for Examples 1 to 5

| Ex. | Bonnot Temp. (° C.) | TSE/Die Temp. (° C.) | TSE ZENITH Pump Speed (rpm) | PSA Flow Rate (kg/hr) | Rod Speed (rpm) | Line Speed (m/min) | Rod Speed (% of Web Speed) | Coating Weight (g/m$^2$) |
|---|---|---|---|---|---|---|---|---|
| 1 | 149 | 160 | 6.5 | 1.4 | 24 | 12.2 | 7.8 | 17.6 |
| 2 | 149 | 160 | 3.2 | 0.7 | 16 | 6.1 | 10.5 | 13.9 |
| 3 | 149 | 160 | 3.2 | 0.7 | 24 | 9.2 | 10.4 | 10.9 |
| 4 | 171 | 160 | 2.0 | 0.4 | 24 | 12.2 | 7.9 | 10.1 |
| 5 | 171 | 177 | 2.0 | 0.4 | 20 | 12.2 | 6.6 | 4.23 |

TABLE 3

Adhesive tape data for Examples 1 to 5

| Ex. | Coating Weight (g/m$^2$) | ATS (N/cm) | Shear Test #1 (minutes) |
|---|---|---|---|
| 1 | 17.6 | 4.5 | 8000+ |
| 2 | 13.9 | 3.1 | 8000+ |
| 3 | 10.9 | 1.9 | 8000+ |
| 4 | 10.1 | 1.8 | 8000+ |
| 5 | 4.23 | 1.0 | 8000+ |

Examples 1 to 5 demonstrate that modified rotary rod slot die process of the invention can provide ultra-low coating weight coatings (less than 15 g/m$^2$) of hot melt tackified SI copolymer PSA. This is obtained can by a combination of low die penetration (less than 254 μm) and spinning the rod at speeds greater than 6.6% of the line speed. The data in Table 2 demonstrate that adhesion to steel can be controlled for hot melt tackified SI copolymer PSAs at coating weights less than 4.2 grains/24 in$^2$ (17.6 g/m$^2$). This has been observed for solvent coatings of rubber based PSAs. The hot melt coatings of the invention had no "edge bead" where the edge is thicker than center of the coating. Reflected light optical microscopy analysis at 50 times magnification of the surface of the coatings revealed the presence of corrugations aligned parallel to the coating direction. The corrugations were separated by 15 μm to 50 μm.

Examples 6 to 9 and Comparative Example C1

Examples 6 to 9 were made in the same manner as Examples 1 to 5 except that a high molecular weight (7.4×10$^5$ g/mol) hot melt acrylic acid ester PSA was coated at ultra-low coating weights.

The acrylic acid ester PSA was prepared using the process described in U.S. Pat. No. 5,804,610 (Hamer et al.). The acrylic acid ester PSA consisted of 90 parts isooctyl acrylate (IOA) monomer, 10 parts acrylic acid (AA) monomer, 0.15 parts per hundred monomer (pphm) IRGACURE™ 651 photo initiator, 0.03 pphm isooctyl thioglycolate (IOTG) chain transfer agent and 0.4 pphm IRGANOX™ 1076 antioxidant. The acrylic acid ester PSA was surrounded by an ethylene vinyl acetate film which was 5 wt. % of the total PSA composition. The Bonnot extruder temperature was set at 350° F. (177° C.) and a ZENITH gear pump operating at 15.0 rpm speed pumped the masticated acrylic PSA at 0.91 kg/hour into Barrel 2 of the TSE. The TSE barrel temperatures were set at 300° F. (149° F.) and the TSE screw speed was 200 rpm. The second 3.0 cc/rev Zenith gear pump was used to control the flow rate of the molten acrylic acid ester PSA to the rotary-rod slot die. A 25 μin (6 μm) Ra rod having a 0.0005 inch (12.7 μm) thick outer layer of chromium oxide on a 0.5 inch (1.3 cm) diameter Thomson 60 CASE LIN-EARRACE shaft was used for Examples 6 to 9. A standard 0.5 inch (1.3 cm) diameter Thomson 60 CASE LINEAR-RACE shaft having an 11 μin (2.6 μm) Ra surface roughness was used for Comparative Example C1. The final penetration distance of the rod into the BOPET film/back-up roll ranged from a "LOW" setting of 0.005 inch (127 μm) to 0.010 inch (254 μm) for Examples 6 to 9 to a "HIGH" setting of 0.020 inch (508 μm) to 0.030 inch (762 μm) for Comparative Example C1. A higher penetration and extruder/die temperature was need for C1 to facilitate coating the high viscosity acrylic acid ester hot melt PSA at ultra-low coating weights using the traditional rotary rod die process described in U.S. Pat. No. 4,167,904 (Mladota et al.). The extreme conditions used to coat Comparative Example C1 substantially deformed the BOPET film leading to wrinkles.

Table 4 summarizes the process parameters and Table 5 summarizes the adhesive tape properties of Examples 6 to 9 and Comparative Example C1.

TABLE 4

Coating process parameters for Examples 6 to 9 and Comparative Example C1

| Ex. | TSE/Die Temp. (° C.) | TSE Zenith Pump Speed (rpm) | Die Slot (in.) | Rod Speed (rpm) | Line Speed (m/min) | Rod Speed (% of Web Speed) | Die pen. | Coating Weight (g/m$^2$) |
|---|---|---|---|---|---|---|---|---|
| 6 | 149 | 6.5 | 0.005 | 27 | 9.2 | 11.7 | LOW | 14.3 |
| 7 | 149 | 3.2 | 0.005 | 22 | 6.1 | 14.4 | LOW | 9.2 |
| 8 | 149 | 3.2 | 0.005 | 27 | 9.2 | 11.7 | LOW | 6.4 |
| 9 | 149 | 2.0 | 0.005 | 30 | 9.2 | 13.0 | LOW | 4.6 |
| C1 | 177 | 2.0 | 0.005 | 15 | 4.6 | 13.0 | HIGH | 12.2 |

TABLE 5

Adhesive tape data for Examples 6 to 9 and Comparative Example C1

| Ex. | Coating Weight (g/m$^2$) | ATS (N/cm) | Shear Test #1 (min.) |
|---|---|---|---|
| 6 | 14.3 | 3.2 | 234 |
| 7 | 9.2 | 0.9 | 228 |
| 8 | 6.4 | 0.3 | 118 |
| 9 | 4.6 | 0.1 | 64 |
| C1 | 12.2 | nm* | nm* |

*not measured

Adhesive properties were difficult to measure for Comparative Example C1 due to wrinkling of the tape during the high-pressure traditional rotary rod slot die contact coating process. Examples 6 to 9 demonstrate that the modified rotary rod die slot process of the invention uses substantially lower die penetration (lower coating nip pressures) to enable coating a high molecular weight hot melt acrylic acid ester PSA with no edge beads at ultra-low coating weights. Adhesion to steel was controlled in the same manner as for Examples 1 to 5 over the ultra-low coating weight range demonstrated in Examples 6 to 9.

Examples 10 to 13

Examples 10 to 13 were prepared using a compounding and coating apparatus for processing natural and synthetic non-thermoplastic elastomer hot melt based PSA described in U.S. Pat. No. 5,539,033 (Bredahl et al.).

A 2 inch (5.1 cm) diameter BONNOT single-stage extruder fitted with a 3.0 cc/rev ZENITH gear pump was used to feed a natural rubber (CV60) into Barrel #1 of a 30 mm diameter fully intermeshing co-rotating TSE [Werner-Pfleiderer (now Coperion GmbH) Model ZSK-30, having a L/D of 37:1)] having conveying and kneading sections. In Examples 10 to 12, the compositions contained a polyterpene tackifying resin (PICCOLYTE™ S115) fed at 10% of the natural rubber feed rate as a solid using a KTRON weight and loss feeder into Barrel #2. The remainder of the resin was melted using a DYNATEC™ grid melter operating at 300° F. (149° C.) and split-fed into Barrel #5 (33%) and Barrel #7 (67%). Example 13 was prepared in the same manner as Examples 10 to 12 except that a hydrocarbon tackifying resin (ESCOREZ™ 1310) replaced the polyterpene resin.

The extruder screw speed was 350 rpm and the temperature profile of the TSE was set at 100° F. (38° C.), 150° F. (66° C.), 150° F. (66° C.), 150° F. (66° C.), 150° F. (66° C.) and 150° F. (66° C.) for temperature Zone 1 (Barrels #2 and #3), Zone 2 (Barrels #4 and #5), Zone 3 (Barrels #6 and #7), Zone 4 (Barrels #8 and #9), Zone 5 (Barrel #10) and Zone 6 (Barrels #11 and #12), respectively. The mixture was discharged from the TSE using a 3.0 cc/rev ZENITH gear pump via a flexible hose to the input of a rotary rod slot die. The mixtures were coated in the same manner as Examples 1 to 5 except that a 0.030 inch (762 µm) die slot thickness was used. The rotary rod slot die contained a standard 0.5 inch (1.3 cm) diameter Thomson 60 CASE LINEARRACE™ shaft having an 11 µin (2.6 µm) Ra surface roughness. The final penetration distance of the rod into the BOPET film/backup roll was "LOW" [0.005 inch (127 µm) to 0.010 inch (254 µm)]. Examples 10 to 12 consisted of 55.5 wt. % natural rubber (NR) and 44.5 wt. % PICCOLYTE™ S115. Example 13 consisted of 50.0 wt. % NR and 50.0 wt. % ESCOREZ™ 1310. The samples were coated onto a 0.0016 inch (41 µm) thick BOPET film having a silicone low adhesion back size (LAB) release coating on the non-coated side of the film.

Table 6 summarizes the process parameters and Table 7 summarizes the adhesive tape properties of Examples 10 to 13.

TABLE 6

Coating process parameters for Examples 10 to 13

| Ex. | Die Temp. (° C.) | TSE Zenith Pump Speed (rpm) | Die Slot (in.) | Rod Speed (rpm) | Line Speed (m/min) | Rod Speed (% of Web Speed) | Die pen. | Coating Weight (g/m²) |
|---|---|---|---|---|---|---|---|---|
| 10 | 149 | 10.1 | 0.030 | 19 | 6.1 | 12.5 | LOW | 24.3 |
| 11 | 149 | 8.3 | 0.030 | 19 | 6.1 | 12.5 | LOW | 21.0 |
| 12 | 149 | 6.3 | 0.030 | 9 | 6.1 | 5.9 | LOW | 16.1 |
| 13 | 149 | 7.1 | 0.030 | 8 | 6.1 | 5.2 | LOW | 20.1 |

TABLE 7

Adhesive tape data for Examples 10 to 13

| Ex. | Coating Weight (g/m²) | ATS MD (N/cm) | ATS TD (N/cm) | Peel anisotropy TD/MD |
|---|---|---|---|---|
| 10 | 24.3 | 0.6 | 2.3 | 3.8 |
| 11 | 21.0 | 0.1 | 2.0 | 20.0 |
| 12 | 16.1 | 0.2 | 1.6 | 8.0 |
| 13 | 20.1 | 0.7 | 2.8 | 4.0 |

Examples 10 to 13 demonstrate that a hot melt PSA containing a high molecular weight (approximately $1\times10^6$ g/mol) natural rubber polymer component and high coating melt viscosity (116 Pa-s) can be coated at ultra-low coating weights using the process of the invention. The high molecular weight NR polymer component (and high NR PSA coating melt viscosity) and large die slot (0.030 inch) combined with the spinning of the rotary-rod in the forward direction led to strain-induced crystallization (SIC) of the NR PSA coating. The presence of SIC in natural rubber hot melt PSAs leads to a reduction in the machine direction (MD) peel adhesion to steel and a peel anisotropy where the cross-direction peel adhesion (TD) is greater than the MD peel adhesion. This phenomenon has been disclosed in U.S. Pat. Nos. 5,858,150 and 5,866,249 (both Yarusso et al.). Thermal treatment of the coating reduces the peel anisotropy by increasing the MD peel adhesion.

Examples 14 to 20

Examples 14 to 20 compositions contained the same NR PSA composition of Example 13 that was re-melted, pumped and coated in the same manner as Examples 6 to 9.

The NR PSA composition of Examples 14 to 20 was pre-compounded on the same TSE apparatus used to make Example 13. The re-melted NR PSA was coated using the same apparatus as for Examples 6 to 9 except the Bonnot was directly attached to the rotary-rod slot die. The Bonnot temperature, Zenith gear pump and rotary rod slot die were set at 300° F. (149° C.). The die was fitted with thinner die slots [0.010 inch (254 µm) and 0.020 inches (508 µm)] than used in Examples 10 to 13. The line speed was set at 20 fpm (6.1 meters/min) Changing the Bonnot Zenith gear pump speed controlled the coating weight. The rotary-rod slot die contained a standard 0.5 inch (1.3 cm) diameter Thomson 60 CASE LINEARRACE™ shaft having an 11 µin (2.6 µm) Ra surface roughness and was rotated in the forward direction. The final penetration distance of the rod into the film/backup roll was "LOW" [0.005 inch (127 µm to 0.010 inch (254 µm)]. The rod speed was adjusted to provide a continuous coating of the hot melt onto 0.0016 inch (41 µm) thick BOPET film having a silicone low adhesion back size (LAB) release coating on the non-PSA coated side of the film.

Table 8 summarizes the process parameters and Table 9 summarizes the adhesive tape properties of Examples 14 to 20.

TABLE 8

Coating process parameters for Examples 14 to 20

| Ex. | Bonnot Zenith pump Speed (rpm) | Die slot (in.) | Rod Speed (rpm) | Rod Speed (% of Web Speed) | Die pen. | Die press. (psi) | Coating Weight (g/m$^2$) |
|---|---|---|---|---|---|---|---|
| 14 | 7.0 | 0.010 | 20 | 13.1 | LOW | 630 | 34.0 |
| 15 | 5.3 | 0.010 | 20 | 13.1 | LOW | 600 | 25.2 |
| 16 | 4.5 | 0.010 | 20 | 13.1 | LOW | 590 | 21.0 |
| 17 | 2.0 | 0.010 | 25 | 16.4 | LOW | 510 | 11.3 |
| 18 | 7.0 | 0.020 | 25 | 16.4 | LOW | 190 | 25.6 |
| 19 | 6.0 | 0.020 | 25 | 16.4 | LOW | 190 | 21.0 |
| 20 | 3.0 | 0.020 | 25 | 16.4 | LOW | 160 | 11.3 |

TABLE 9

Adhesive tape data for Examples 14 to 20

| Ex. | Coating Weight (g/m$^2$) | ATS MD (N/cm) | ATS TD (N/cm) | Peel Anisotropy TD/MD | RBT (mm) | Shear Test #1 (min) |
|---|---|---|---|---|---|---|
| 14 | 34.0 | 1.8 | 2.1 | 1.2 | 91 | 8 |
| 15 | 25.2 | 2.0 | 1.8 | 0.9 | 121 | 14 |
| 16 | 21.0 | 1.4 | 1.5 | 1.1 | 186 | 15 |
| 17 | 11.3 | 0.2 | 0.7 | 3.5 | 300+ | 33 |
| 18 | 25.6 | 1.7 | 1.7 | 1.0 | 98 | 8 |
| 19 | 21.0 | 1.5 | 1.4 | 0.9 | 142 | 26 |
| 20 | 11.3 | 0.4 | 1.32 | 3.3 | 300+ | 137 |

Examples 14 to 20 demonstrate that the process of the invention can coat high viscosity (100 Pa-s) hot melt natural rubber based PSAs with less strain-induced crystallization (SIC) than was observed with Examples 10 to 13. Most of the examples had minimal peel anisotropy resulting from the thinner die slots (0.010 inch and 0.020 inch) used for Examples 14 to 20 compared to the 0.030 inch die slot used for Examples 10 to 13.

Samples of Examples 14 to 20 were exposed to electron beam radiation from an ELECTROCURTAIN Model CB-300 (from Energy Sciences Inc., Wilmington, Mass.) operating at 130 kilovolts (kV) of accelerating voltage. The irradiation was performed in an inert nitrogen atmosphere at a calculated dose of 4.0 megarads (mrads). Table 10 contains the adhesive tape data for Examples 21 to 27.

TABLE 10

Adhesive tape data for Examples 21 to 27

| Ex. | Coating Weight (g/m$^2$) | EB Dose (mrads) | ATS MD (N/cm) | ATS TD (N/cm) | Peel Anisotropy TD/MD | RBT (mm) | Shear Test #1 (min) |
|---|---|---|---|---|---|---|---|
| 21 | 1.93 | 4.0 | 2.4 | 2.2 | 0.9 | 134 | 339 |
| 22 | 1.43 | 4.0 | 2.1 | 1.8 | 0.9 | 196 | 502 |
| 23 | 1.19 | 4.0 | 1.3 | 1.3 | 1.0 | 268 | 526 |
| 24 | 0.64 | 4.0 | 0.19 | 0.50 | 2.6 | 300+ | 2768 |
| 25 | 1.45 | 4.0 | 1.7 | 1.8 | 1.1 | 171 | 837 |
| 26 | 1.19 | 4.0 | 1.1 | 1.2 | 1.1 | 300+ | 2765 |
| 27 | 0.64 | 4.0 | 0.4 | 0.6 | 1.5 | 300+ | 3000+ |

Exposure to electron beam irradiation increased the shear holding power as expected.

Examples 28 to 29 and Comparative Example C2

Thermoplastic polyolefin resin pellets (PRIMACOR™ 3330 ethylene-acrylic acid copolymer) were fed into a 58 mm diameter co-rotating TSE (Davis Standard model D-Tex 58 with 13 barrel sections and a 42:1 L/D) containing mixing and conveying sections. The temperature profile of the extruder was set to provide a 500° F. (260° C.) molten flow of polyolefin. A 100 cc/rev gear pump transported the molten resin from the TSE to a rotary-rod slot die that was deckled to provide a 24 inch (61.0 cm) wide coating. The film was 24.5 inches (62.2 cm) wide, 0.003 inch (76 μm) thick, TiO$_2$ filled BOPET.

A standard 0.5 inch (1.3 cm) diameter Thomson 60 CASE LINEARRACE shaft having an 11 μin (2.6 μm) Ra surface roughness was used for Examples 28 to 29 and Comparative Example C2. The rod die and flowing molten polyolefin were indexed toward the moving BOPET film and rubber-covered backup roll with the rod spinning at 50 rpm in the forward direction. The final position was determined by noting the penetration of the die where a coating width that was equivalent to the deckled width (24 inches) was obtained. The final rod speed was chosen to provide a continuously coated polyolefin film on the moving BOPET film substrate. Slower rod speeds produced uncoated regions of polyolefin material (voids) on the BOPET film substrate. The rotary rod slot die was maintained at a 2° angle (below the horizontal 9 o'clock position) with the moving BOPET film. The BOPET film was 0.003 inch (76 μm) thick. The die slot was maintained at either 0.015 inch (381 μm) or 0.008 inch (203 μm).

Tables 11 and 12 contain the process conditions and selected properties of Examples 28 to 29 and Comparative Example C2.

TABLE 11

Process conditions of Examples 28 to 29 and Comparative Example C2

| Ex. | Flow Rate (kg/hr) | Die Slot (in.) | Rod Speed (rpm) | Web Speed (m/min) | Rod Speed % of Web Speed |
|---|---|---|---|---|---|
| 28 | 34.5 | 0.015 | 101 | 41.2 | 9.8 |
| C2 | 34.5 | 0.015 | 20 | 41.2 | 1.9 |
| 29 | 28.1 | 0.008 | 55 | 43.0 | 5.1 |

TABLE 12

Coating properties of Examples 28 to 29 and Comparative Example C2

| Ex. | Coating Weight (g/m$^2$) | Coating Thickness (μm) | Coating Density (g/cc) | Edge bead? | % Gloss |
|---|---|---|---|---|---|
| 28 | 21.1 | nm* | nm* | No | 5.0 |
| C2 | nm* | nm* | nm* | nm* | nm* |
| 29 | 19.9 | 22.6 | 0.880 | No | 5.2 |

*not measured

Examples 28 to 29 demonstrate that the process of the invention can coat a high viscosity (167 Pa-s) thermoplastic polyolefin at low coating weights with no coating edge beads. Comparative Example C2 demonstrates that a rod speed that is 1.9% of the linear line speed of the moving web was too slow for this hot melt polymer to provide a continuous down-web and cross-web coating. The coatings also had low gloss (approximately 5% at 60°) consistent with a flat or matte finished gloss (the low gloss a result of the corrugated surface structures. Optical microscopy (polarized reflected light at 250× magnification) of the surfaces of Examples 28 and 29 reveal semi-continuous (over 4 mm long) corrugations oriented parallel to the coating direction. The corrugations are separated by 50 to 200 µm. As a result of the corrugated surface, the coating density of the resultant coating in Example 29 was found to be 0.880 g/cc which is about 5.4% lower than the density of PRIMACOR™ 3330 Polymer.

Examples 30 to 32 and Comparative Examples C3 to C5

Examples 30 to 32 and Comparative Examples C3 to C5 were prepared using the same compounding and coating apparatus described for Examples 28 to 29 and Comparative Example C2.

A hot melt tackified styrene-isoprene (SI) thermoplastic elastomeric block copolymer PSA was coated using the process of the invention at high speeds (191 meters/min) and low coating weights (10.5 g/m²). The SI copolymer PSA had a wide viscosity range at the coating conditions for these Examples [139 Pa-s melt viscosity at 300° F. (149° C.) and 63 Pa-s melt viscosity at 400° F. (205° C.)]. The PSA consisted of 54.7/43.7/0.8/0.8 QUINTAC™ 3620/WINTACK™ EXTRA/IRGANOX™ 1076/ARENOX™ DL. The QUINTAC 3620 pellets were fed into the feed throat (Barrel #1) of the TSE. The WINGTACK EXTRA tackifier was melted and split fed into Barrel #4 (35%) and Barrel #6 (65%). The antioxidants (IRGANOX™ 1076 and ARENOX™ DL) were melted and split fed into Barrel #4 (35%) and Barrel #6 (65%). The TSE screw speed was 200 rpm.

The extrusion process set point parameters for Examples 30 to 32 and Comparative Examples C3 to C5 are summarized in Table 13.

TABLE 13

Extrusion process set point parameters for Examples 30 to 32 and Comparative Examples C3 to C5

| Ex. | BBL1 temp. (° C.) | BBL2 temp. (° C.) | BBL3 temp. (° C.) | BBL4 to 8 temp. (° C.) | BBL9 to 15 temp. (° C.) | TSE gear pump temp. (° C.) | Transport hose temp. (° C.) | Die temp. (° C.) |
|---|---|---|---|---|---|---|---|---|
| C3 | 10 | 93 | 121 | 93 | 121 | 149 | 149 | 149 |
| 30 | 10 | 93 | 121 | 93 | 121 | 149 | 149 | 149 |
| C4 | 10 | 177 | 199 | 199 | 199 | 204 | 204 | 204 |
| 31 | 10 | 177 | 199 | 199 | 199 | 204 | 204 | 204 |
| C5 | 10 | 177 | 199 | 199 | 199 | 204 | 204 | 204 |
| 32 | 10 | 177 | 199 | 199 | 199 | 204 | 204 | 204 |

The total hot melt PSA flow rate was set at 150 pounds/hr (68 kg/hour) to provide a coating weight in the range of 2 to 3 grains/24 in² (8 to 13 g/m²) at 625 feet/min (191 meters/minute) line speed. A standard 0.5 inch (1.3 cm) diameter Thomson 60 CASE LINEARRACE shaft having an 11 µin (2.6 µm) Ra surface roughness was used in the rotary-rod slot die. The rotary rod slot die was maintained at a 4.0° angle (below the horizontal 9 o'clock position) with the moving BOPET film with the moving 26 inches (66 cm) wide biaxially oriented polypropylene (BOPP) film. The line speed was 625 feet/min (191 meters/min). The BOPP film was 0.0013 inches (33 µm) thick. The die was deckled to provide 25.0 inches (63.5 cm) wide coating. The die slot was maintained at either 0.015 inch (381 µm) or 0.005 inch (127 µm). The rod speed was rotated at a constant 10 rpm (in the forward direction) for Comparative Examples C3 to C5 to exemplify the typically used contact coating rotary-rod slot die process described in U.S. Pat. No. 4,167,914.

The range of rod speeds that gave an acceptable continuous coating was recorded for Examples 30 to 32. No coating was obtained for the 0.015 inch die slot at 300° F. (149° C.) for any rod speed due to poor flow through the slot die from the high viscosity of the PSA at this temperature. Table 14 summarizes the coating process conditions for Examples 30 to 32 and Comparative Examples C3 to C5 and Table 15 contains selected PSA tape properties for Examples 31 to 32.

TABLE 14

Coating process parameters for Examples 30 to 32 and Comparative Examples C3 to C5

| Ex. | Melt Temp. (° C.) | Die slot (in.) | Rod Speed Range (rpm) | Rod Speed (% of Web Speed) | Die pen. (µm) | Die press. (psi) | Coating defect | Coating Weight Average and Range (g/m²) |
|---|---|---|---|---|---|---|---|---|
| C3 | 149 | 0.005 | 10 | 0.2 | 254 | 902 | chevron/zigzag | 11.7<br>7.5 to 17.2 |
| 30 | 149 | 0.005 | 100 to 215 | 2.1 to 4.5 | 216 | 758 | fine ribs | 8.4<br>8.3 to 8.5 |
| C4 | 204 | 0.005 | 10 | 0.2 | 269 | 454 | chevron/zigzag | 10.1<br>8.5 to 10.9 |
| 31 | 204 | 0.005 | 100 range nm | 2.1 | 269 | 425 | fine ribs | 10.1<br>9.7 to 10.3 |
| C5 | 204 | 0.015 | 10 | 0.2 | 538 | 314 | chevron/zigzag | 10.0<br>9.9 to 10.1 |
| 32 | 204 | 0.015 | 80 to 120 | 1.7-2.5 | 505 | 302 | fine ribs | 10.2<br>9.2 to 11.2 |

TABLE 15

Adhesive tape data for Examples 31 to 32

| Ex. | Coating Weight (g/m²) | ATS (N/cm) | RBT (mm) | Shear Test #1 (min.) | FB shear (min.) |
|---|---|---|---|---|---|
| 31 | 10.1 | 31 | 120 | 10,000+ | 569 |
| 32 | 10.2 | 31 | 118 | 10,000+ | 456 |

The adhesive tape data summarized in Table 11 demonstrate that ultralow coating weight tackified SI copolymer PSAs of the invention coated at high coatings speeds (625 feet/min) provide acceptable performance for carton sealing tape applications at substantially lower coating weights than available from current hot melt coating methods (slot die and drop-die take-away).

Examples 33 to 34 and Comparative Examples C6 to C7

Examples 33 to 34 and Comparative Examples C6 to C7 demonstrate high-speed coating of a high molecular weight ($8.1 \times 10^5$ g/mol) acrylic acid ester PSA using the same compounding and coating apparatus described for Examples 30 to 32 and Comparative Examples C3 to C5.

The acrylic acid ester PSA was made in the same manner as for Examples 6 to 9 except a different monomer mixture was used. The acrylic acid ester PSA consisted of 95 parts IOA monomer, 5 parts AA monomer, 0.10 pphm IRGACURE™ 651 photo initiator, 0.02 pphm IOTG chain transfer agent and 0.4 pphm IRGANOX™ 1076 antioxidant. The acrylic acid ester PSA was masticated and fed to Barrel #1 of the TSE using a dual roll feeder (DAVIS-STANDARD™ model 35IN35) having a 3.5 inches (8.9 cm) outer diameter screw conveying screw fitted with a gear melt pump (model LCI ES45/45, from Textron, Inc., Providence, R.I.) having 46.2 cc/rev.

Table 16 summarizes the dual roll feeder process set point parameters for Examples 33 to 34 and Comparative Examples C6 to C7.

TABLE 16

Dual roll feeder process set point parameters for Examples 33 to 34 and Comparative Examples C6 to C7

| Ex. | Dual Roll Barrel Temps. (° C.) | Dual Roll Screw Speed (rpm) | Dual Roll Gear Pump Temp. (° C.) | Dual Roll Gear Pump Speed (rpm) |
|---|---|---|---|---|
| C6 | 177 | 31.0 | 177 | 49.5 |
| 33 | 177 | 30.0 | 177 | 49.5 |
| C7 | 177 | 29.1 | 177 | 49.5 |
| 34 | 177 | 29.5 | 177 | 49.5 |

The dual roll feeder masticated and pumped the acrylic acid ester PSA at 174 pounds/hour (79.0 kg/hour) into Barrel #1 of the TSE. The TSE screw speed was 200 rpm. The extrusion process set point parameters for Examples 33 to 34 and Comparative Examples C6 to C7 are summarized in Table 17.

TABLE 17

Extrusion process set point parameters for Examples 33 to 34 and Comparative Examples C6 to C7

| Ex. | BBL1 temp. (° C.) | BBL2 temp. (° C.) | BBL3 temp. (° C.) | BBL4 to 8 temp. (° C.) | BBL9 to 15 temp. (° C.) | TSE gear pump temp. (° C.) | Transport hose temp. (° C.) | Die temp. (° C.) |
|---|---|---|---|---|---|---|---|---|
| C6 | 10 | 177 | 177 | 177 | 177 | 177 | 177 | 177 |
| 33 | 10 | 177 | 177 | 177 | 177 | 177 | 177 | 177 |
| C7 | 10 | 177 | 177 | 177 | 177 | 177 | 177 | 177 |
| 34 | 10 | 177 | 177 | 177 | 177 | 177 | 177 | 177 |

A standard 0.5 inch (1.3 cm) diameter Thomson 60 CASE LINEARRACE shaft having an 11 μin (2.6 μm) Ra surface roughness was used in the rotary-rod slot die. The rotary-rod slot die was maintained at a 4.0 degree angle (below the horizontal 9 o'clock position) with the moving biaxially oriented polypropylene (BOPP) film. The die was deckled to provide 25.0 inches (63.5 cm) wide coating. The line speed was 625 feet/min (191 meters/min) The BOPP film was 0.0013 inches (33 μm) thick and 26.0 inches (66.0 cm) wide. The die slot was either 0.015 inches (381 μm) or 0.005 inches (127 μm). The rod speed was a constant 10 rpm in the forward direction for Comparative Examples C6 and C7 to exemplify the known contact coating rotary-rod slot die process described in U.S. Pat. No. 4,167,914 (Mladota). The range of rod speeds that gave an acceptable continuous coating was recorded for Examples 33 to 34. It should be noted that changes in rod speed (relative to line speed–speed ratio) do not change the coating weight unlike gapped forward roll coating methods. The presence of uncoated lanes or regions devoid of PSA was also recorded. Table 18 summarizes the coating process conditions and Table 19 contains selected PSA tape properties for Examples 33 to 34 and Comparative Examples C6 to C7.

TABLE 18

Coating process parameters for Examples 33 to 34 and Comparative Examples C6 and C7

| Ex. | Melt Temp. (° C.) | Die Slot (in.) | Rod Speed Range (rpm) | Rod Speed (% of Web Speed) | Die pen. (μm) | Die press. (psi) | Uncoated lanes? (voids) | Coating Weight (g/m²) CW range |
|---|---|---|---|---|---|---|---|---|
| C6 | 177 | 0.005 | 10 | 0.2 | 533 | 444 | Yes | nm* |
| 33 | 177 | 0.005 | 225 to 500 | 4.7 to 10.5 | 145 | 362 | No Fine ribs | 11.0<br>10.1 to 12.1 (2.0) |
| C7 | 177 | 0.015 | 10 | 0.2 | 389 | 396 | Yes | nm* |

TABLE 18-continued

Coating process parameters for Examples 33 to 34 and Comparative Examples C6 and C7

| Ex. | Melt Temp. (° C.) | Die Slot (in.) | Rod Speed Range (rpm) | Rod Speed (% of Web Speed) | Die pen. (μm) | Die press. (psi) | Uncoated lanes? (voids) | Coating Weight (g/m²) CW range |
|---|---|---|---|---|---|---|---|---|
| 34 | 177 | 0.015 | 175 to 275 | 3.7 to 5.8 | 305 | 362 | No Fine ribs | 9.6 9.5 to 9.7 (0.1) |

*not measured

TABLE 19

Adhesive tape data for Examples 33 and 34

| Ex. | Coating Weight (g/m²) | ATS (N/cm) | Shear Test #3 (min.) |
|---|---|---|---|
| 33 | 11.0 | 1.5 | 185 |
| 34 | 9.6 | 1.9 | 129 |

A high molecular weight ($8.1 \times 10^5$ g/mol) acrylic acid ester hot melt PSA was readily coated at high speeds (191 meters/minute) and ultra-low coating weights (less than 0.0005 inch thick or 13.7 g/m²) using the process of the invention. Substantially higher rod speeds than those described in U.S. Pat. No. 4,167,914 were required to provide a continuous down-web and cross-web coating that was free of voids. The ultra-low hot melt PSA coating weights enable manipulation of the peel adhesion to various substrates since it is a strong function of coating weight (thickness) below 55 g/m² coating weight or 0.002 inch (50.8 μm) of coating thickness (Handbook of Pressure Sensitive Adhesive Technology 2$^{nd}$ Edition, Donatas Satas pp. 77-79). Another useful processing feature is the reduced die pressure at the higher rod speeds of the invention (Examples 33 to 34) compared to the typically used rod speeds described in U.S. Pat. No. 4,167,914 (Comparative Examples C6 and C7).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The complete disclosure of all patents, patent documents, and publications cited herein are incorporated by reference.

LIST OF ILLUSTRATIVE EMBODIMENTS

The following are illustrative Embodiments of articles and processes of the invention:

Embodiment 1. An article comprising a substrate having a first surface and a melt coated layer having a first major surface and a second major surface, the first major surface of the melt coated layer being disposed upon the first surface of the substrate, wherein the melt coated layer is substantially continuous and comprises a melt coated composition selected from the group consisting of:

(a) one or more acrylic polymers having a collective molecular weight of at least about 200,000, and the melt coated layer has a coating weight less than about 25 g/m², is free of solvents, and contains no more than about 1% by weight of gelled acrylic polymer;

(b) one or more thermoplastic elastomers having a collective melt viscosity greater than about 20,000 cP, measured at any temperature suitable for hot-melt coating and at shear rates less than 100 sec$^{-1}$ or frequencies less than 100 rad/sec, and the melt coated layer has a coating weight less than about 12 g/m²;

(c) one or more natural rubbers or synthetic rubbers, none of which are thermoplastic elastomers, having a collective molecular weight of at least about 200,000 g/mol and a collective melt viscosity greater than about 50,000 cP, measured at any temperature suitable for hot-melt coating and at shear rates less than 100 sec$^{-1}$ or frequencies less than 100 rad/sec, and the melt coated layer has a coating weight less than about 29 g/m²; and (d) one or more nonelastomeric thermoplastic polymers having a collective molecular weight of from about 50,000 to about 3,000,000 g/mol, and the melt coated layer has a coating weight less than about 17 g/m² and is free of solvents.

Embodiment 2. The article of Embodiment 1 wherein the melt coated layer is substantially free of liquid medium.

Embodiment 3. The article of Embodiment 1 wherein the melt coated layer is self tacky.

Embodiment 4. The article of Embodiment 1 wherein the melt coated layer exhibits pressure-sensitive adhesive properties.

Embodiment 5. The article of Embodiment 1 wherein the second major surface of the melt coated layer has a matte finish.

Embodiment 6. The article of Embodiment 1 wherein the melt coated layer exhibits a gloss reduction of from about 1 to about 9% at a 60° measuring angle.

Embodiment 7. The article of Embodiment 1 wherein the second major surface of the melt coated layer has a plurality of raised striations.

Embodiment 8. The article of Embodiment 7 wherein the coating density of the melt coated layer is from about 60 to about 95% of the melt coated composition density.

Embodiment 9. The article of Embodiment 7 wherein the raised striations have an average height of less than about 25 microns.

Embodiment 10. The article of Embodiment 7 wherein the raised striations have an average height of about 5 to about 10 microns.

Embodiment 11. The article of Embodiment 7 wherein the raised striations are irregularly spaced, and no pair of adjacent raised striations has a spacing more than ten times the spacing of any other pair of adjacent raised striations.

Embodiment 12. The article of Embodiment 7 wherein the plurality of raised striations has an average spacing between adjacent raised striations of about 20 to about 500 microns.

Embodiment 13. The article of Embodiment 7 wherein the plurality of raised striations has an average spacing between adjacent raised striations of about 150 to about 200 microns.

Embodiment 14. The article of Embodiment 1 wherein the melt coated layer has no through voids larger than pinholes.

Embodiment 15. The article of Embodiment 1 wherein the substrate is flexible.

Embodiment 16. The article of Embodiment 1 wherein the substrate comprises two or more layers.

Embodiment 17. The article of Embodiment 1 wherein the substrate comprises at least one of a polymeric film, a fabric, a metal film, or a paper.

Embodiment 18. The article of Embodiment 1 wherein the substrate comprises at least one of biaxially oriented polypropylene and polyester.

Embodiment 19. The article of Embodiment 1 wherein the article is an adhesive tape or an adhesive sheeting.

Embodiment 20. The article of Embodiment 19 wherein the article is selected from the group consisting of box sealing tape, masking tape, medical tape, graphics sheeting, and a reflective sheeting.

Embodiment 21. The article of Embodiment 1 wherein the article is in the form of roll goods, and wherein the coated layer has no edge bead before slitting or converting.

Embodiment 22. The article of Embodiment 1 wherein the melt coated layer consists essentially of one or more acrylic polymers.

Embodiment 23. The article of Embodiment 1 wherein the melt coated layer comprises acrylic polymer selected from the group consisting of polymers and copolymers of isooctyl acrylate.

Embodiment 24. The article of Embodiment 1 wherein the melt coated layer comprises one or more acrylic polymers and the melt coated layer is substantially free of tackifiers, oils, and plasticizers.

Embodiment 25. The article of Embodiment 1 wherein the melt coated layer comprises one or more acrylic polymers and has a coating weight is less than about 21 $g/m^2$.

Embodiment 26. The article of Embodiment 1 wherein the melt coated layer comprises one or more acrylic polymers and has a coating weight is less than about 17 $g/m^2$.

Embodiment 27. The article of Embodiment 1 wherein the melt coated layer comprises one or more acrylic polymers and has a coating weight is less than about 13 $g/m^2$.

Embodiment 28. The article of Embodiment 1 wherein the melt coated layer comprises one or more acrylic polymers and has a coating weight is less than about 9 $g/m^2$.

Embodiment 29. The article of Embodiment 1 wherein the melt coated layer comprises one or more acrylic polymers having a collective molecular weight of at least about 500,000.

Embodiment 30. The article of Embodiment 1 wherein the melt coated layer comprises one or more acrylic polymers having a collective molecular weight of at least about 800,000.

Embodiment 31. The article of Embodiment 1 wherein the melt coated layer comprises one or more acrylic polymers having a collective molecular weight of at least about 1,000,000.

Embodiment 32. The article of Embodiment 1 wherein the melt coated layer comprises one or more thermoplastic elastomers selected from the group consisting of styrene block copolymers.

Embodiment 33. The article of Embodiment 32 wherein the styrene block copolymer comprises a styrene-isoprene-styrene triblock copolymer or a styrene-ethylene/butylenes-styrene triblock copolymer.

Embodiment 34. The article of Embodiment 1 wherein the melt coated layer comprises one or more thermoplastic elastomers and further comprises a tackifying resin.

Embodiment 35. The article of Embodiment 34 wherein the tackifying resin is a $C_5$ resin.

Embodiment 36. The article of Embodiment 1 wherein the melt coated layer comprises one or more thermoplastic elastomers and is substantially free of oil and plasticizers.

Embodiment 37. The article of Embodiment 1 wherein the melt coated layer comprises one or more thermoplastic elastomers and has a coating weight less than about 9 $g/m^2$.

Embodiment 38. The article of Embodiment 1 wherein the melt coated layer comprises one or more thermoplastic elastomers having a melt viscosity measured at any temperature suitable for hot-melt coating greater than about 50,000 cP.

Embodiment 39. The article of Embodiment 1 wherein the melt coated layer comprises one or more thermoplastic elastomers having a collective melt viscosity measured at any temperature suitable for hot-melt coating greater than about 100,000 cP.

Embodiment 40. The article of Embodiment 1 wherein the melt coated layer comprises one or more thermoplastic elastomers having a collective melt viscosity measured at any temperature suitable for hot-melt coating greater than about 1,000,000 cP.

Embodiment 41. The article of Embodiment 1 wherein the melt coated layer consists essentially of natural or synthetic rubber.

Embodiment 42. The article of Embodiment 1 wherein the melt coated layer comprises one or more rubbers selected from the group consisting of natural rubbers and synthetic rubbers and contains no more than about 1% by weight of gelled natural or synthetic rubber.

Embodiment 43. The article of Embodiment 1 wherein the melt coated layer comprises one or more rubbers selected from the group consisting of natural rubbers and synthetic rubbers and further comprises at least one additive selected from the group consisting of tackifiers and plasticizers.

Embodiment 44. The article of Embodiment 43 wherein the melt coated layer comprises 10 to 200 parts by weight tackifier per 100 parts by weight natural rubber.

Embodiment 45. The article of Embodiment 1 wherein the melt coated layer comprises one or more rubbers selected from the group consisting of natural rubbers and synthetic rubbers and has a coating weight is less than about 25 $g/m^2$.

Embodiment 46. The article of Embodiment 1 wherein the melt coated layer comprises one or more rubbers selected from the group consisting of natural rubbers and synthetic rubbers and has a coating weight is less than about 19 $g/m^2$.

Embodiment 47. The article of Embodiment 1 wherein the melt coated layer comprises one or more rubbers selected from the group consisting of natural rubbers and synthetic rubbers and has a coating weight is less than about 15 $g/m^2$.

Embodiment 48. The article of Embodiment 1 wherein the melt coated layer comprises one or more rubbers selected from the group consisting of natural rubbers and synthetic rubbers and has a coating weight is less than about 11 $g/m^2$.

Embodiment 49. The article of Embodiment 1 wherein the melt coated layer comprises one or more rubbers s elected from the group consisting of isoprene, butadiene, nitrile rubber, and styrene-butadiene rubber.

Embodiment 50. The article of Embodiment 1 wherein the melt coated layer comprises one or more rubbers having a collective melt viscosity of at least about 100,000 cP.

Embodiment 51. The article of Embodiment 1 wherein the melt coated layer comprises one or more rubbers having a collective melt viscosity of at least about 1,000,000 cP.

Embodiment 52. The article of Embodiment 1 wherein the melt coated layer consists essentially of nonelastomeric thermoplastic polymer.

Embodiment 53. The article of Embodiment 1 wherein the melt coated layer comprises one or more nonelastomeric thermoplastics and has a coating weight less than about 13 g/m$^2$.

Embodiment 54. The article of Embodiment 1 wherein the melt coated layer comprises one or more nonelastomeric thermoplastics and has a coating weight less than about 9 g/m$^2$.

Embodiment 55. The article of Embodiment 1 wherein the melt coated layer comprises one or more nonelastomeric thermoplastic polymers selected from the group consisting of polyolefins and aliphatic polyesters.

Embodiment 56. The article of Embodiment 1 wherein the melt coated layer comprises one or more semicrystalline nonelastomeric thermoplastic polymers.

Embodiment 57. A process for making articles with a melt coated layer thereon, the process comprising the steps of:

(a) conveying a molten coating composition comprising a polymer through a die slot having a thickness less than about 35 mils;

(b) directly contacting the molten composition to the entry side of a nip point between a rotating rod having a diameter less than about 3 inches (7.6 cm) and a moving substrate supported on a backup roller, wherein a sufficiently small nipping pressure is employed such that the surface of the backup roller is deformed by no more than a depth of about 20 mils; and (c) obtaining a substrate with a melt coated layer thereon on the exit side of the nip point;

wherein the rotating rod and the compressible backup roller are each rotating in the direction of motion of the moving substrate; and wherein the rotating rod is rotating at greater than about 20 rpm, and has surface speed that is between about 1 and about 20% of the speed of the moving substrate.

Embodiment 58. The process of Embodiment 57 wherein the molten coating composition is selected from the group consisting of:

(a) one or more acrylic polymers having a collective molecular weight of at least about 200,000, the composition being free of solvents and containing no more than about 1% by weight of gelled acrylic polymer; or (b) one or more thermoplastic elastomers having a collective melt viscosity measured at any temperature suitable for hot-melt coating and at shear rates less than 100 sec$^{-1}$ or frequencies less than 100 rad/sec is greater than about 20,000 cP; or (c) one or more natural rubbers or synthetic rubbers having a collective molecular weight of at least about 200,000 g/mol and which is not a thermoplastic elastomer, and having a melt viscosity measured at any temperature suitable for hot-melt coating and at shear rates less than 100 sec$^{-1}$ or frequencies less than 100 rad/sec greater than about 50,000 cP; or (d) one or more nonelastomeric thermoplastic polymers having a collective molecular weight of from about 50,000 to about 3,000,000 g/mol, the composition being free of solvents.

Embodiment 59. The process of Embodiment 57 wherein the die slot has a thickness less than about 15 mils (380 micrometers).

Embodiment 60. The process of Embodiment 57 wherein the die slot has a thickness less than about 10 mils (250 micrometers).

Embodiment 61. The process of Embodiment 57 wherein the die slot has a thickness less than about 5 mils (125 micrometers).

Embodiment 62. The process of Embodiment 57 wherein the die slot has a thickness greater than about 1 mil (25 micrometers).

Embodiment 63. The process of Embodiment 57 wherein the rotating rod has a diameter less than about 2 inches (5 cm).

Embodiment 64. The process of Embodiment 57 wherein the rotating rod has a diameter less than 1 inch (2.5 cm).

Embodiment 65. The process of Embodiment 57 wherein the rotating rod has a diameter from about ¼ to about ¾ inch (0.6 to 2 cm).

Embodiment 66. The process of Embodiment 57 wherein the backup roller is compressible.

Embodiment 67. The process of Embodiment 57 wherein the surface of the backup roller is deformed by no more than a depth of about 10 mils (380 micrometers).

Embodiment 68. The process of Embodiment 57 wherein the surface of the backup roller is deformed by no more than a depth of about 5 mils (125 micrometers).

Embodiment 69. The process of Embodiment 57 wherein the surface of the backup roller is deformed by no more than a depth of about 1 mil (25 micrometers).

Embodiment 70. The process of Embodiment 57 wherein the surface of the backup roller is deformed to a depth of from about 1 to about 20 mils (25 to 500 micrometers).

Embodiment 71. The process of Embodiment 57 wherein the backup roller is non-compressible.

Embodiment 72. The process of Embodiment 57 wherein the rotating rod has a tangential surface speed that is between about 1 and about 15% of the speed of the moving substrate.

Embodiment 73. The process of Embodiment 57 wherein the rotating rod has a tangential surface speed that is between about 1 and about 10% of the speed of the moving substrate.

Embodiment 74. The process of Embodiment 57 wherein the rotating rod has a tangential surface speed that is between about 1 and about 5% of the speed of the moving substrate.

Embodiment 75. The process of Embodiment 57 wherein the rotating rod has a tangential surface speed that is between about 2 and about 20% of the speed of the moving substrate.

Embodiment 76. The process of Embodiment 57 wherein the rotating rod has a tangential surface speed that is between about 2 and about 10% of the speed of the moving substrate.

Embodiment 77. The process of Embodiment 57 wherein the rotating rod has a tangential surface speed that is between about 5 and about 20% of the speed of the moving substrate.

Embodiment 78. The process of Embodiment 57 wherein the rotating rod has a tangential surface speed that is between about 5 and about 10% of the speed of the moving substrate.

Embodiment 79. The process of Embodiment 57 wherein the viscosity of the molten composition is greater than about 10,000 cP.

Embodiment 80. The process of Embodiment 57 wherein the viscosity of the molten composition is greater than about 50,000 cP.

Embodiment 81. The process of Embodiment 57 wherein the viscosity of the molten composition is greater than about 100,000 cP.

Embodiment 82. The process of Embodiment 57 wherein the viscosity of the molten composition is greater than about 1,000,000 cP.

Embodiment 83. The process of Embodiment 57 wherein the rotating rod is smooth or has a surface texture having a value of $R_A$ less than about 1000 microinches (2.5 μm).

Embodiment 84. The process of Embodiment 57 wherein the rotating rod has a surface texture having a value of $R_A$ less than about 100 microinches (2.5 μm).

Embodiment 85. The process of Embodiment 57 wherein the rotating rod has a surface texture having a value of $R_A$ less than about 20 microinches (0.5 μm).

Embodiment 86. The process of Embodiment 57 wherein the coated substrate has no visible edge bead before slitting or converting.

Embodiment 87. The process of Embodiment 57 wherein the moving substrate is moving at over about 200 feet/minute (60 meters/minute).

Embodiment 88. The process of Embodiment 57 wherein the moving substrate is moving at over about 500 feet/minute (150 meters/minute).

Embodiment 89. The process of Embodiment 57 wherein the moving substrate is moving at over about 1000 feet/minute (300 meters/minutes).

Embodiment 90. The process of Embodiment 57 wherein there is no visible rolling bank created by contacting the molten composition to the entry side of the nip point.

Embodiment 91. The process of Embodiment 57 wherein the thickness of the die slot, the surface speed of the rotating rod, and the nipping pressure are set within ranges such that, within the ranges, the thickness of the coated substrate depends on the thickness of the die slot and the surface speed of the rotating rod, and is independent of the nipping pressure.

Embodiment 92. The process of Embodiment 57 wherein the substrate is flexible.

Embodiment 93. The process of Embodiment 57 wherein the substrate comprises two or more layers.

Embodiment 94. The process of Embodiment 57 wherein the substrate comprises at least one of a polymeric film, a non-woven web, or a paper.

Embodiment 95. The process of Embodiment 57 wherein the substrate has been primed to improve adhesion of the melt coated layer thereto.

Embodiment 96. The process of Embodiment 57 further comprising:
(d1) winding the substrate with melt coated layer thereon onto itself in roll form.

Embodiment 97. The process of Embodiment 96 wherein the melt coated layer is not dried between step (c) and step (d1).

Embodiment 98. The process of Embodiment 57 further comprising cross linking the melt coated layer after step (c).

Embodiment 99. The process of Embodiment 57 further comprising:
(d2) contacting the melt coated layer to an adherend to adhere the substrate to the adherend.

Embodiment 100. The process of Embodiment 99 wherein the melt coated layer is not dried between step (c) and step (d2).

What is claimed is:

1. A process for making articles with a melt coated layer thereon utilizing a coating head comprising a die slot defined by an upstream bar and a downstream bar separated by a gap D1, the process comprising the steps of:
  (a) conveying a molten coating composition comprising a polymer through the die slot, the die slot having a thickness less than about 35 mils;
  (b) directly contacting the molten composition to the entry side of a nip point between a rotating rod having a diameter less than about 3 inches (7.6 cm) and a moving substrate supported on a backup roller, wherein a sufficiently small nipping pressure is employed such that the surface of the backup roller is deformed by no more than a depth of about 20 mils, wherein the rotating rod and upstream bar are separated by a gap D2, gap D2 being less than or substantially equal to gap D1; and
  (c) obtaining a substrate with a melt coated layer thereon on the exit side of the nip point;
wherein the rotating rod and the compressible backup roller are each rotating in the direction of motion of the moving substrate; and
wherein the rotating rod is rotating at greater than about 20 rpm, and has surface speed in the direction of the moving substrate that is between about 1 and about 20% of the speed of the moving substrate.

2. The process of claim 1 wherein the molten coating composition is selected from the group consisting of:
  (a) one or more acrylic polymers having a collective molecular weight of at least about 200,000, the composition being free of solvents and containing no more than about 1% by weight of gelled acrylic polymer; or
  (b) one or more thermoplastic elastomers having a collective melt viscosity measured at any temperature suitable for hot-melt coating and at shear rates less than 100 sec$^{-1}$ or frequencies less than 100 rad/sec is greater than about 20,000 cP; or
  (c) one or more natural rubbers or synthetic rubbers having a collective molecular weight of at least about 200,000 g/mol and which is not a thermoplastic elastomer, and having a melt viscosity measured at any temperature suitable for hot-melt coating and at shear rates less than 100 sec$^{-1}$ or frequencies less than 100 rad/sec greater than about 50,000 cP; or
  (d) one or more nonelastomeric thermoplastic polymers having a collective molecular weight of from about 50,000 to about 3,000,000 g/mol, the composition being free of solvents.

3. The process of claim 1 wherein the die slot has a thickness less than about 15 mils (380 micrometers).

4. The process of claim 1 wherein the rotating rod has a diameter less than about 2 inches (5 cm).

5. The process of claim 1 wherein the rotating rod has a tangential surface speed that is between about 1 and about 15% of the speed of the moving substrate.

6. The process of claim 1 wherein the viscosity of the molten composition is greater than about 10,000 cP.

7. The process of claim 1 wherein the rotating rod is smooth or has a surface texture having a value of $R_A$ less than about 1000 microinches (25 μm).

8. The process of claim 1 wherein the coated substrate has no visible edge bead before slitting or converting.

9. The process of claim 1 wherein the moving substrate is moving at over about 200 feet/minute (60 meters/minute).

10. The process of claim 1 wherein there is no visible rolling bank created by contacting the molten composition to the entry side of the nip point.

11. The process of claim 1 wherein the thickness of the die slot, the surface speed of the rotating rod, and the nipping pressure are set within ranges such that, within the ranges, the thickness of the coated substrate depends on the thickness of the die slot and the surface speed of the rotating rod, and is independent of the nipping pressure.

12. The process of claim 1 further comprising:
(d1) winding the substrate with melt coated layer thereon onto itself in roll form.

13. The process of claim 12 wherein the melt coated layer is not dried between step (c) and step (d1).

14. The process of claim 1 further comprising cross linking the melt coated layer after step (c).

15. The process of claim 14 further comprising:
(d2) contacting the melt coated layer to an adherend to adhere the substrate to the adherend wherein the melt coated layer is not dried between step (c) and step (d2).

* * * * *